(12) United States Patent
Kato

(10) Patent No.: US 7,440,038 B2
(45) Date of Patent: Oct. 21, 2008

(54) LIQUID CRYSTAL TELEVISION AND LIQUID CRYSTAL DISPLAY APPARATUS

(75) Inventor: Yoshiharu Kato, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 546 days.

(21) Appl. No.: 11/166,395

(22) Filed: Jun. 23, 2005

(65) Prior Publication Data
US 2006/0001782 A1    Jan. 5, 2006

(30) Foreign Application Priority Data
Jun. 25, 2004   (JP) .................... 2004-003729 U

(51) Int. Cl.
*H04N 5/64* (2006.01)
(52) U.S. Cl. .................... 348/794; 348/790; 348/836; 248/919
(58) Field of Classification Search ............. 348/790, 348/794, 836, 838, 843; 248/919, 920, 922–923; 345/205, 87, 905; *H04N 5/64*
See application file for complete search history.

(56) References Cited
U.S. PATENT DOCUMENTS
5,969,776 A * 10/1999 Han ..................... 348/836
6,307,530 B1 * 10/2001 Cho ....................... 345/87
6,343,006 B1 * 1/2002 Moscovitch et al. ....... 361/681

FOREIGN PATENT DOCUMENTS

| JP | 63-036932 | 2/1988 |
|----|-----------|--------|
| JP | 06-005905 | 1/1994 |
| JP | 06-335740 | 12/1994 |
| JP | 06-335741 | 12/1994 |
| JP | 10-020804 | 1/1998 |
| JP | 10-146625 | 6/1998 |
| JP | 2000-308248 | 11/2000 |
| JP | 2001-016753 | 1/2001 |
| JP | 2002-149078 | 5/2002 |

* cited by examiner

*Primary Examiner*—Trang U Tran
(74) *Attorney, Agent, or Firm*—Peter Ganjian

(57) ABSTRACT

There is disclosed a liquid crystal display apparatus including a main body and a swivel mechanism, where the main body is capable of smoothly swiveling. A countersunk hole is formed in a bottom plate member as follows: When a through-hole for inserting a screw is formed in a metal sheet to be a bottom plate member, there is also concurrently formed an accommodating hole for accommodating flow of the material forming the metal sheet upon plastic forming or pressing which is performed subsequently for forming a countersink, and then the countersink is formed at an open end of the through-hole by pressing. It is preferable that a plurality of the accommodating holes are formed around the through-hole.

16 Claims, 18 Drawing Sheets

FIG. 6
COUNTERSUNK HOLE FOR FIXING GUIDE MEMBER AND UPPER COVER
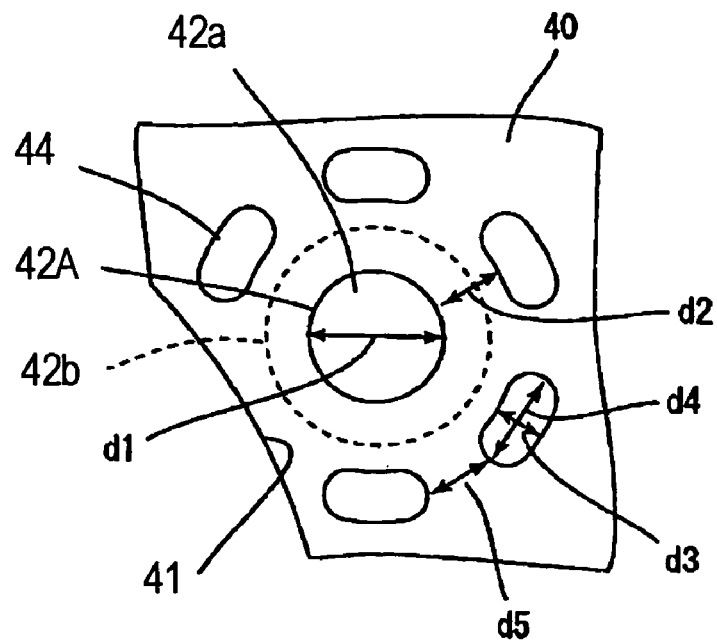
COUNTERSUNK HOLE FOR FIXING ONLY UPPER COVER
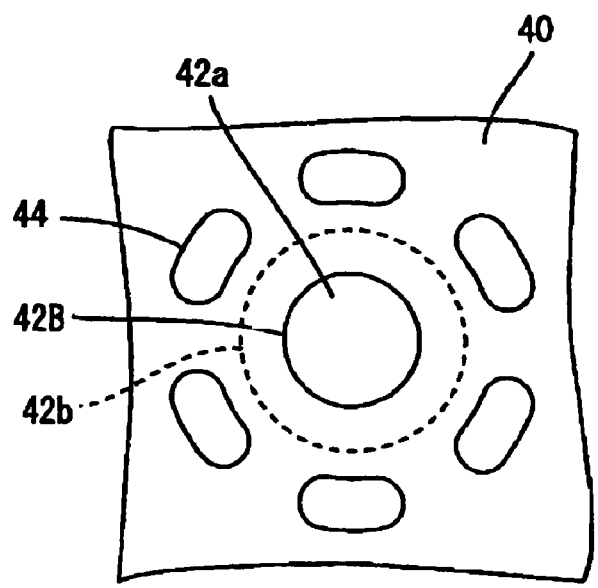

FIRST PROCESS
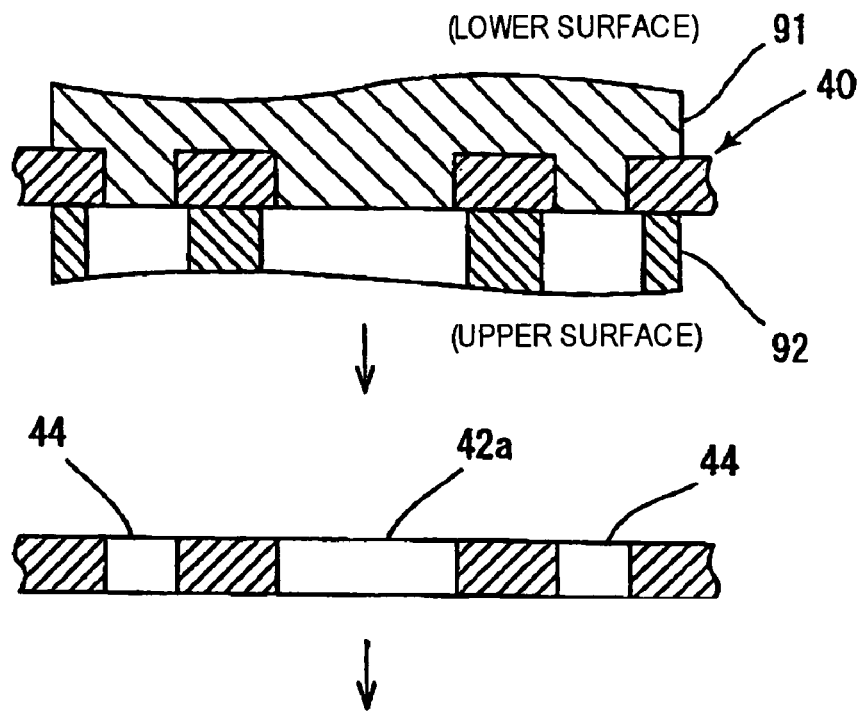
SECOND PROCESS
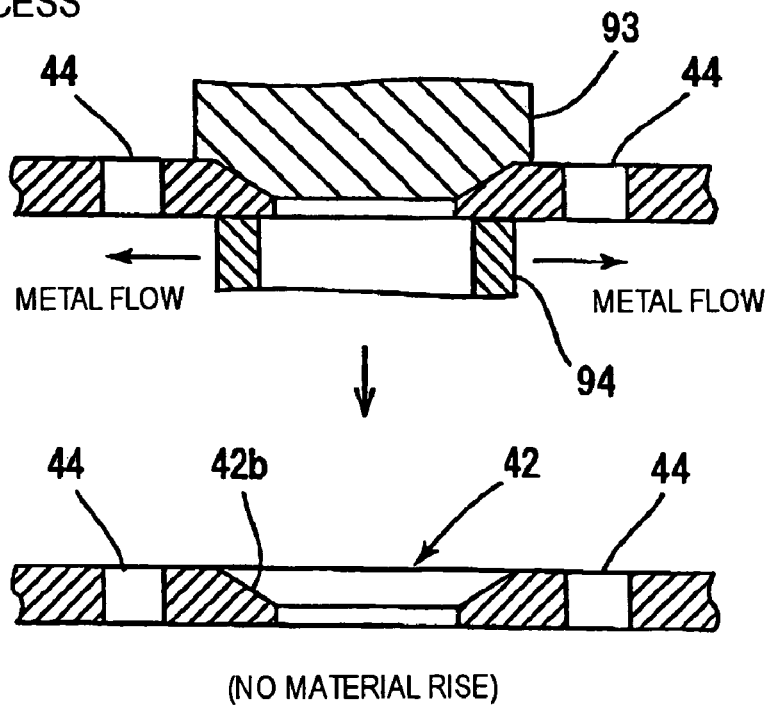

FIRST PROCESS
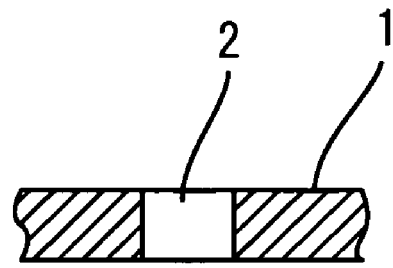
SECOND PROCESS
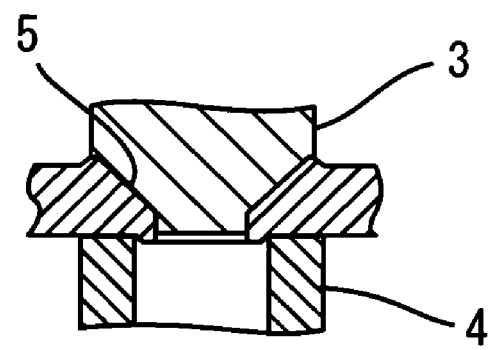
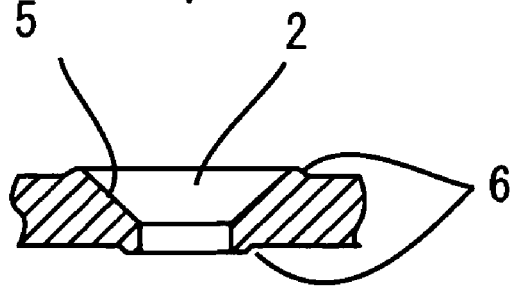
FIG. 18
(PRIOR ART)

LIQUID CRYSTAL TELEVISION AND LIQUID CRYSTAL DISPLAY APPARATUS

BACKGROUND OF THE INVENTION

1. Field of the Invention

The present invention relates to a liquid crystal television and a liquid crystal display apparatus which comprise a stand, and a main body having a liquid crystal display surface on which images are presented, and being supported by the stand to be rotatable relatively to the stand around a rotation axis extending toward the stand.

2. Description of the Prior Art

There is known a liquid crystal television comprising a stand, and a main body having a resin cabinet and a liquid crystal display surface on which images are presented, and being supported by the stand to be rotatable relatively to the stand around a vertical rotation axis. The stand comprises a metallic bottom plate member having a plurality of countersunk holes and disposed at the bottom of the stand, an upper cover of resin having a plurality of first screw holes of a first and a second group formed in a lower surface thereof at positions respectively corresponding to the countersunk holes of a first and a second group so that the bottom plate member and the upper cover are secured together by first screws, a guide member of resin having a plurality of screw holes which are formed through the thickness of the guide member at respective positions corresponding to the countersunk holes of the first group so that the guide member is also screwed together with the bottom plate member and the upper cover, and a metallic support unit which is supported by the guide member such that the support unit is rotatable relatively to and along the guide member, and supports the main body of the television.

The upper cover is secured to the bottom plate member by inserting second screws through the countersunk holes of the second group and the first screw holes of the second group as aligned with the countersunk holes of the second group, and tightening the second screws. The guide member is annular, and its second screw holes are aligned with the countersunk holes of the first group and the first screw holes of the first group so that the guide member is fixed between the bottom plate member and the upper cover by the first screws and in a horizontal position with the center of the guide member on the vertical rotation axis.

In the conventional television constructed as described above, the main body supported by the support unit is capable of swiveling around the rotation axis extending vertically.

To form in the bottom plate member the countersunk holes, namely, the holes with their one end outwardly tapered, through-holes for inserting the screws are first punched out in a metal sheet and then countersinks are formed by pressing, causing plastic deformation at a periphery of an open end of each of the through-holes which is open in a surface of the metal sheet to be a lower surface of the bottom plate member.

Japanese Patent Application Laid Open No. 63-36932 discloses a technique in which a hole is initially punched in a metal sheet to be a metal plate member in a first pressing step, and then a countersink is formed at an open end of the prepared hole in a second pressing step. In the technique of this publication, slits are formed in the metal sheet to be radially arranged around the prepared hole, so that, in the second pressing step for forming the countersink, the material forming the metal plate member is plastically deformed to flow into the slits contiguous with the prepared hole.

In the former technique, as shown in FIG. 18, when a countersink 5 is formed by pressing using a punch 3 and a die 4, after a through-hole 2 is punched in a metal sheet 1, using a punch and a die for instance, a rise of the material may occur around the through-hole 2. Such a material rise causes a deformation of the guide member when the guide member and the bottom plate member are screwed together, generating a relatively large friction force between the support unit and the guide member when the main body of the television is swiveled, since the main body is supported by the support unit which is rotated along the guide member. Accordingly, this conventional technique suffers from unsmooth swiveling of the main body.

When the latter technique where the slits contiguous with the prepared hole are provided is employed in manufacturing of the liquid crystal display apparatus or liquid crystal television, the shape of a plurality of the prepared holes inevitably varies, causing a variation or error in screwing positions when the guide member and the bottom plate member are screwed together. This results in a deformation of the guide member which hinders smooth swiveling of the main body of the television.

Japanese patent Application Laid Open No. 6-5905 discloses a technique of closing a prepared hole by pressing, but does not teach a solution of the problem of the unsmooth swiveling of the main body.

SUMMARY OF THE INVENTION

The present invention has been developed in view of the above-described situations, and its object is to provide a liquid crystal display apparatus, such as a liquid crystal television, which has a main body and a swivel mechanism and where the main body is capable of smoothly swiveling.

To attain the object, one aspect of the present invention resides in a liquid crystal television comprising:

a main body capable of swiveling around a vertically extending rotation axis, and comprising:
  a resin cabinet; and
  a liquid crystal display surface for presenting images thereon; and
a stand comprising:
  a metal bottom plate member disposed at the bottom of the stand, and comprising:
    a plurality of first countersunk holes for inserting a plurality of first screws, and a plurality of second countersunk holes for inserting a plurality of second screws, the first and second countersunk holes being formed by initially punching out a plurality of through-holes in a metal sheet, and then forming countersinks at respective open ends of the through-holes which are open in a surface of the metal sheet to be a lower surface of the bottom plate member, by plastic deformation of the metal sheet by pressing; and
    a plurality of accommodating holes which are formed around each of the through-holes, by punching concurrently with the punching out of the through-holes, so as to accommodate the material forming the metal sheet which is flowed upon the formation of the countersinks, in order to prevent the material from rising around the through-hole;
  an upper cover formed of a resin, and having in its lower surface a plurality of first screw holes comprising a first group formed at respective positions corresponding to the first countersunk holes, and a second group formed at respective positions corresponding to the second countersunk holes, so that the upper cover is secured to the bottom plate member by inserting the first screws into the first countersunk holes and the first screw holes of the first group while each of the first countersunk holes is aligned with a corresponding one of the first screw holes of the first group and tightening the first screws, and inserting the second screws into the second countersunk holes and the first screw holes of the second group while each of the second countersunk holes is aligned with a corresponding one of the first screw holes of the second group and tightening the second screws;

an annular guide member formed of a resin, comprising:
  an upper extending portion protruding from an upper surface of the guide member along the entire circumference at a radial position outward of an inner circumferential surface of the guide member and inward of an outer circumferential surface of the guide member;
  a lower extending portion protruding from a lower surface of the guide member along the entire circumference at a radial position outward of an inner circumferential surface of the guide member and inward of an outer circumferential surface of the guide member;
  an upper contact portion upward protruding intermittently along the entire circumference from the upper surface of the guide member at a radial position between the inner circumferential surface of the guide member and an inner circumferential surface of the upper extending portion;
  a lower contact portion downward protruding along the entire circumference from the lower surface of the guide member at a radial position between the inner circumferential surface of the guide member and an inner circumferential surface of the lower extending portion; and
  a plurality of second screw holes formed through the guide member at respective positions which are located radially outward of an outer circumferential surface of the upper extending portion and an outer circumferential surface of the lower extending portion, to be aligned with the first countersunk holes and the first screw holes of the first group, so that the guide member is fixed in a horizontal position between the bottom plate member and the upper cover and centered on the rotation axis, by the inserting the first screws into the first countersunk holes and the first screw holes of the first group and tightening the first screws;

a metal support unit which is supported to be rotatable with respect to and along the guide member, and supports the main body such that the main body is capable of swiveling with respect to the stand and around the rotation axis, the metal support unit comprising:
  a metal upper disk member which has a diameter larger than that of the inner circumferential surface of the guide member and smaller than that of the inner circumferential surface of the upper extending portion, and a lower surface of the upper metal disk contacting an upper end of the upper contact portion;
  a metal lower disk member which is fixed at its portion located radially inward of the inner circumferential surface of the guide member to the lower surface of the upper disk member, and has a diameter larger than that of the inner circumferential surface of the guide member and smaller than the inner circumferential surface of the lower extending portion, at least a radial part of the lower disk member between the inner circumferential surface of the guide member and the inner circumferential surface of the lower extending portion being located under the guide member, so that the lower disk member contacts a lower end of the lower contact portion; and
  a metal support member fixed to an upper surface of the upper disk member so as to support the main body such that the upper and lower disk members sandwiching a radial part of the guide member which is inward of the inner circumferential surface of the upper extending portion and the inner circumferential surface of the lower extending portion, and that the metal support member is rotatable with respect to and along the guide member; and the positions of a plurality of combinations each consisting of one of the first countersunk holes and a corresponding one of the first screw holes of the first group, being symmetric with respect to the center point of the guide member.

According to this arrangement, the main body of the television is enabled to extremely smoothly swivel.

As a more general arrangement, another aspect of the present invention resides in a liquid crystal display apparatus comprising:
  a main body capable of swiveling around a rotation axis, comprising:
    a cabinet; and
    a liquid crystal display surface for presenting images thereon; and
  a stand aligned with the main body along a direction of the rotation axis, comprising:
    a metal plate member comprising:
      a countersunk hole for inserting a screw, which is formed by initially forming a through-hole in a metal sheet, and then countersinking, by plastic forming, an open end of the through-hole; and
      an accommodating hole which is formed around the through-hole concurrently with the formation of the through-hole, so as to accommodate the material forming the metal sheet flowed upon the plastic formation of the countersink;
    an annular guide member having a screw hole aligned with the countersunk hole so that the guide member and the plate member are secured to each other by inserting the screw through the countersunk hole and the screw hole and tightening the screw, while the guide member is centered on the rotation axis; and
    a metal support unit supported to be rotatable with respect to and along the guide member so as to support the main body.

According to this arrangement, the countersunk hole of the plate member of the stand are formed by first forming in the metal sheet the through-hole for inserting the screw as well as the accommodating hole around the through-hole, and then forming the countersink at the through-hole by plastic forming. Upon the plastic forming, the material forming the metal sheet plastically flows into the accommodating hole to be accommodated there. This prevents rising of the material around the through-hole, which would be otherwise caused. Thus, the annular guide member is screwed with high precision, without a slight deformation of the guide member which is found in the conventional arrangement. Thus, the main body is enabled to smoothly swivel.

In still another aspect, the liquid crystal display apparatus of the invention may be arranged such that the stand comprises:
- a metal plate member comprising:
    - a plurality of first countersunk holes for inserting a plurality of first screws, the first countersunk holes being formed by initially punching out a plurality of through-holes in a metal sheet to be the plate member, and then forming countersinks at respective open ends of the through-holes which are open in one of opposite surfaces of the metal sheet, by plastic deformation of the metal sheet by pressing; and
    - a plurality of accommodating holes which are formed around each of the through-holes, by punching concurrently with the punching out of the through-holes, so as to accommodate the material forming the metal sheet which is flowed upon the formation of the countersinks;
- an opposing member having, in its surface opposed to the other surface of the plate member opposite to the surface in which the countersinks are formed, a plurality of first screw holes formed at respective positions corresponding to the first countersunk holes, so that the opposing member and the plate member are secured to each other by inserting the first screws into the first countersunk holes and the first screw holes while each of the first countersunk holes is aligned with a corresponding one of the first screw holes and tightening the first screws;
- an annular guide member comprising a plurality of second screw holes formed through the guide member at respective positions corresponding to the first countersunk holes and the first screw holes, so that the guide member is fixed between the plate member and the opposing member and centered on the rotation axis, by the inserting the first screws into the first countersunk holes and the first screw holes and tightening the first screws; and
- a support unit which is supported to be rotatable with respect to and along the guide member, so as to support the main body such that the main body is capable of swiveling with respect to the stand and around the rotation axis;
- and the positions of a plurality of combinations each consisting of one of the first countersunk holes and a corresponding one of the first screw holes are symmetric with respect to the center point of the guide member.

According to this arrangement, the countersunk holes of the plate member of the stand are formed by first forming in the metal sheet the through-holes for inserting the first screws as well as the accommodating holes around each of the through-holes, and then forming the countersinks at the through-holes by the plastic deformation by pressing. Upon the pressing, the material forming the metal sheet plastically flows into the accommodating holes to be accommodated there. This prevents the material rise around each of the through-holes which would be otherwise caused, enabling to screw the annular guide member with high precision, without a slight deformation of the guide member which is found in the conventional arrangement. Thus, the main body is enabled to smoothly swivel.

A liquid crystal display apparatus to which the invention is applied may be a liquid crystal television including a receiving device for receiving airwaves and outputting images, or a liquid crystal monitor comprising a display apparatus not including such a receiving device.

Where the opposing member further has, at respective positions radially outward of the guide member, a plurality of third screw holes for inserting second screws to secure the plate member and the opposing member to each other, the plate member further comprises a plurality of countersunk holes formed at respective positions corresponding to the third screw holes by first punching out a plurality of second through-holes in the metal sheet, and then forming, by pressing, countersinks at respective open ends of the through-holes which are open on the surface of the metal sheet in which the countersinks of the first countersunk holes are formed, and a plurality of accommodating holes which are formed around each of the second through-holes, by punching, concurrently with the punching out of the second through-holes, so as to accommodate the material forming the metal sheet which is flowed upon the formation of the countersinks.

Even when the above-described material rise does not occur around the countersunk holes corresponding to the second screw holes of the annular guide member for directly screwing the annular guide member together with the plate member and the opposing member, the guide member may slightly deform when the material rise occurs around the countersunk holes corresponding to the third screw holes, which are formed for screwing the plate member to the opposing member with the guide member interposed between the plate member and the opposing member. According to this arrangement, however, the guide member is screwed with a further enhanced precision. Hence, the slight deformation of the guide member is prevented further reliably, enabling the main body to further smoothly swivel.

The above-described apparatus may be arranged such that the annular guide member is formed of a resin and disposed in a horizontal position while the rotation axis extends vertically, and the annular guide member further comprises:
- an upper extending portion protruding from an upper surface of the guide member along the entire circumference at a radial position outward of an inner circumferential surface of the guide member and inward of an outer circumferential surface of the guide member;
- a lower extending portion protruding from a lower surface of the guide member along the entire circumference at a radial position outward of an inner circumferential surface of the guide member and inward of an outer circumferential surface of the guide member; and
- a plurality of the second screw holes formed through the guide member at respective positions which are located radially outward of an outer circumferential surface of the upper extending portion and an outer circumferential surface of the lower extending portion, and the support unit comprises:
- a metal upper disk member which has a diameter larger than that of the inner circumferential surface of the guide member and smaller than the inner circumferential surface of the upper extending portion, and apart of the upper disk member which is radially inward of an inner circumferential surface of the upper extending portion contacts at least a part of the upper surface of the guide member;
- a metal lower disk member which is fixed to the upper disk member, and has a diameter larger than that of the inner circumferential surface of the guide member and smaller than that of the inner circumferential surface of the lower extending portion, the lower disk member being located under the guide member at least at its radial part between the inner circumferential surface of the guide member and the inner circumferential surface of the lower extending portion; and
- a metal support member fixed to an upper surface of the upper disk member to support the main body, such that the upper and lower disk members sandwich a radial part of the guide member which is radially inward of the inner circumferential surface of the upper extending portion and the inner circumferential surface of the lower extending portion, and the metal support member is rotatable with respect to and along the guide member.

According to the arrangement where the metal upper disk member is placed on the upper surface of the annular guide member at a radial position inward of the upper extending portion while the metal lower disk member is placed on the lower surface of the guide member at a position inward of the lower extending portion, and the metal support unit is supported to be rotatable relatively to the guide member, with a radially inward part of the guide member sandwiched between the upper and lower disk members of the support unit, the main body supported by the support unit is enabled to further smoothly swivel.

The guide member may further comprise an upper contact portion upward protruding intermittently along the entire circumference from the upper surface of the guide member at a radial position between the inner circumferential surface of the guide member and an inner circumferential surface of the upper extending portion. An upper end of the upper contact portion is in contact with a lower surface of the upper disk member.

According to this arrangement, the contact area at which the guide member as fixed and the rotatable upper disk member is relatively small, enabling to further smoothly swivel the main body.

The guide member may further comprise a lower contact portion downward protruding along the entire circumference from the lower surface of the guide member at a radial position between the inner circumferential surface of the guide member and an inner circumferential surface of the lower extending portion. A lower end of the lower contact portion is in contact with an upper surface of the lower disk member.

According to this arrangement, the contact area at which the guide member as fixed and the rotatable lower disk member is relatively small, enabling to further smoothly swivel the main body.

The apparatus may be such that the lower disk member has a first upward protrusion and a second upward protrusion each protruding from a place on the upper surface of the lower disk member including an extreme circumferential edge, with the first and second upward protrusions being spaced from each other by a first rotation angle, the guide member has a first rib and a second rib each formed to extend downward from the lower surface of the guide member at respective positions spaced by a second rotation angle larger than the first rotation angle, such that the first and second ribs respectively extend radially inward from the lower extending portion, and the support unit is supported to be rotatable relatively to the guide member with the first and second upward protrusions inserted between the first and second ribs.

According to this arrangement, swiveling of the main body is limited to a range with a simple structure.

A plurality of the accommodating holes may be formed around the each of the through-holes such that each of the accommodating holes is spaced from a circumference of the through-hole by a distance of ⅕ to 1 times a diameter of the through-hole.

Where the distance between the circumference of the through-hole and each of the accommodating holes formed therearound is ⅕ of the diameter of the through-hole or larger, the circumference of the through-hole and the each accommodating hole is separated by a distant sufficient in view of the second step for forming the countersinks, namely, a distant assuring a sufficient mechanical strength of the countersunk holes, while where the distance between the circumference of the through-hole and the each accommodating hole is not larger than the diameter of the through-hole, the material around the through-hole is reliably flowed into the accommodating holes, preventing the material rise around the through-hole. Thus, the guide member is screwed with a further enhanced precision, preventing the slight deformation of the guide member further reliably. Accordingly, the main body is enabled to further smoothly swivel.

It may be arranged such that the each of the accommodating holes formed around the each through-hole has a diameter of ¼ to ¾ of the diameter of the through-hole.

Where the diameter of each of the accommodating holes is ¼ of the diameter of the through-hole or larger, the material around the through-hole is prevented from rising and reliably flowed into the accommodating holes, while where the diameter of the each accommodating hole is ¾ of the diameter of the through-hole or smaller, an amount of material which assures a sufficient mechanical strength of the countersunk holes is present around the through-hole. Accordingly, the guide member is screwed with a further enhanced precision, preventing the slight deformation of the guide member further reliably. Thus, the main body is enabled to further smoothly swivel.

It may be arranged such that at least a part of the accommodating holes formed around the each through-hole are spaced from an adjacent other by a distance of ⅕ to 1 times the diameter of the through-hole.

Where the distance between each adjacent two of at least a part of the accommodating holes formed around the each through-hole is ⅕ of the diameter of the through-hole or larger, the each adjacent two accommodating holes are spaced from each other by a distance sufficient in view of the second step for forming the countersinks, namely, a distance assuring a sufficient mechanical strength of the countersunk holes, while where the distance between the each adjacent two of the at least a part of the accommodating holes is equal to or smaller than the diameter of the through-hole, the material around the through-hole is reliably flowed into the accommodating holes, preventing the material rise. Hence, the guide member is screwed with a further enhanced reliability, preventing the slight deformation of the guide member further reliably. Thus, the main body is enabled to further smoothly swivel.

BRIEF DESCRIPTION OF THE DRAWINGS

FIG. 6 is a view of relevant portions of the bottom plate member, showing two kinds of countersunk holes and a plurality of accommodating holes therearound, as seen from the upper side.

FIG. 16 is a cross-sectional view illustrating how the countersunk hole and the accommodating holes are formed.

FIG. 18 is a cross-sectional view illustrating the conventional way of forming a countersunk hole.

DETAILED DESCRIPTION OF THE PREFERRED EMBODIMENTS

Figure 1:
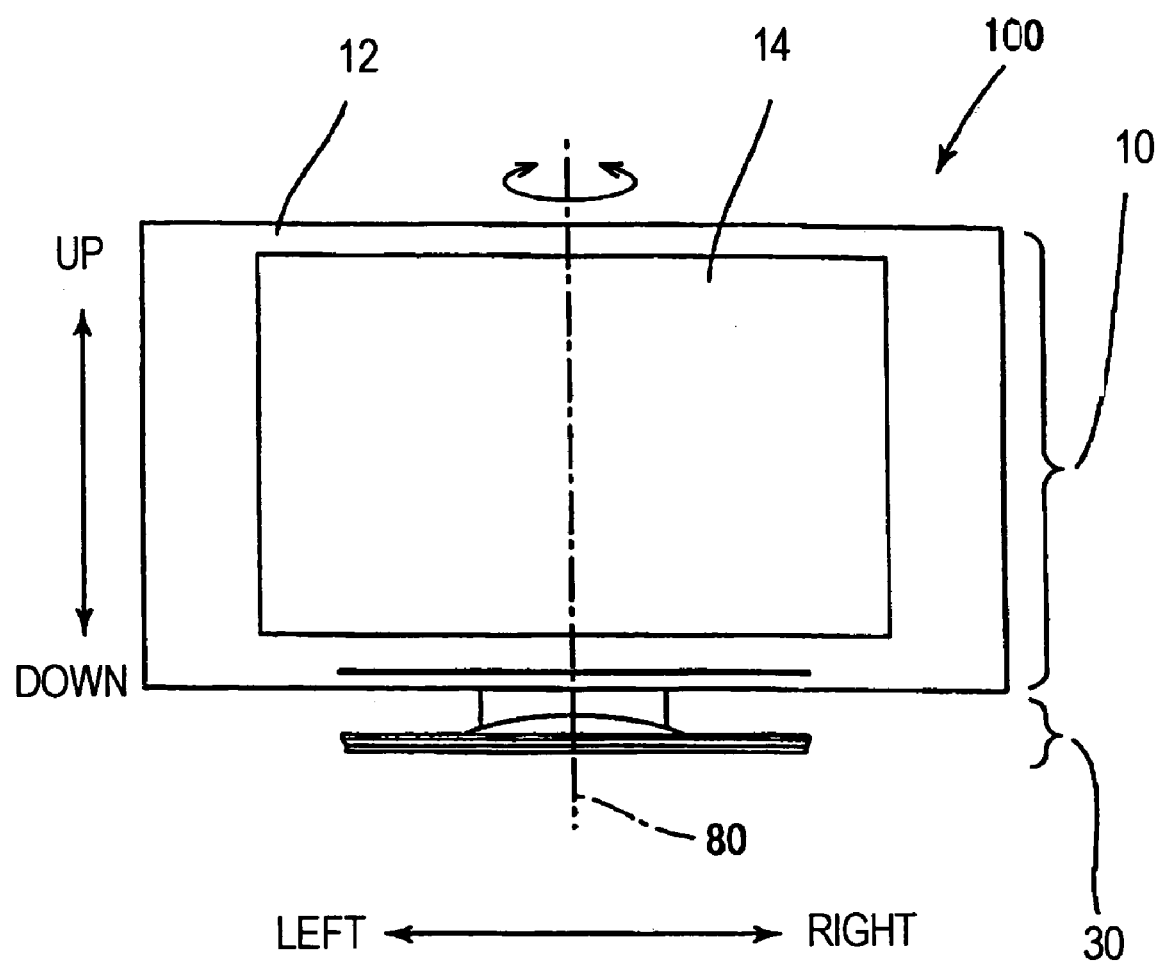
FIG. 1 is a front elevational view of a liquid crystal display apparatus in the form of a liquid crystal television, according to one embodiment of the invention.
Figure 2:
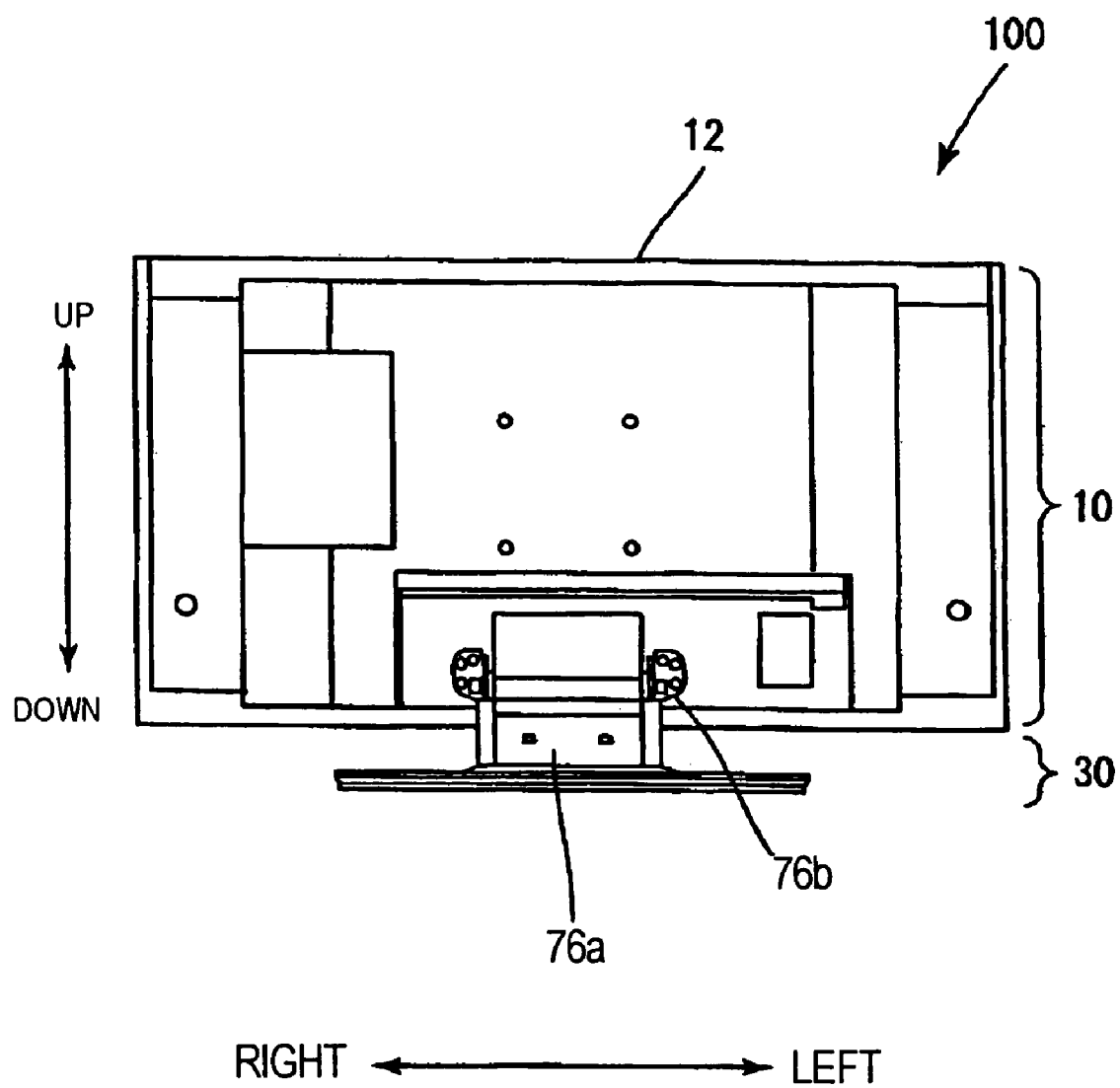
FIG. 2 is a rear view of the liquid crystal television.
Figure 3:
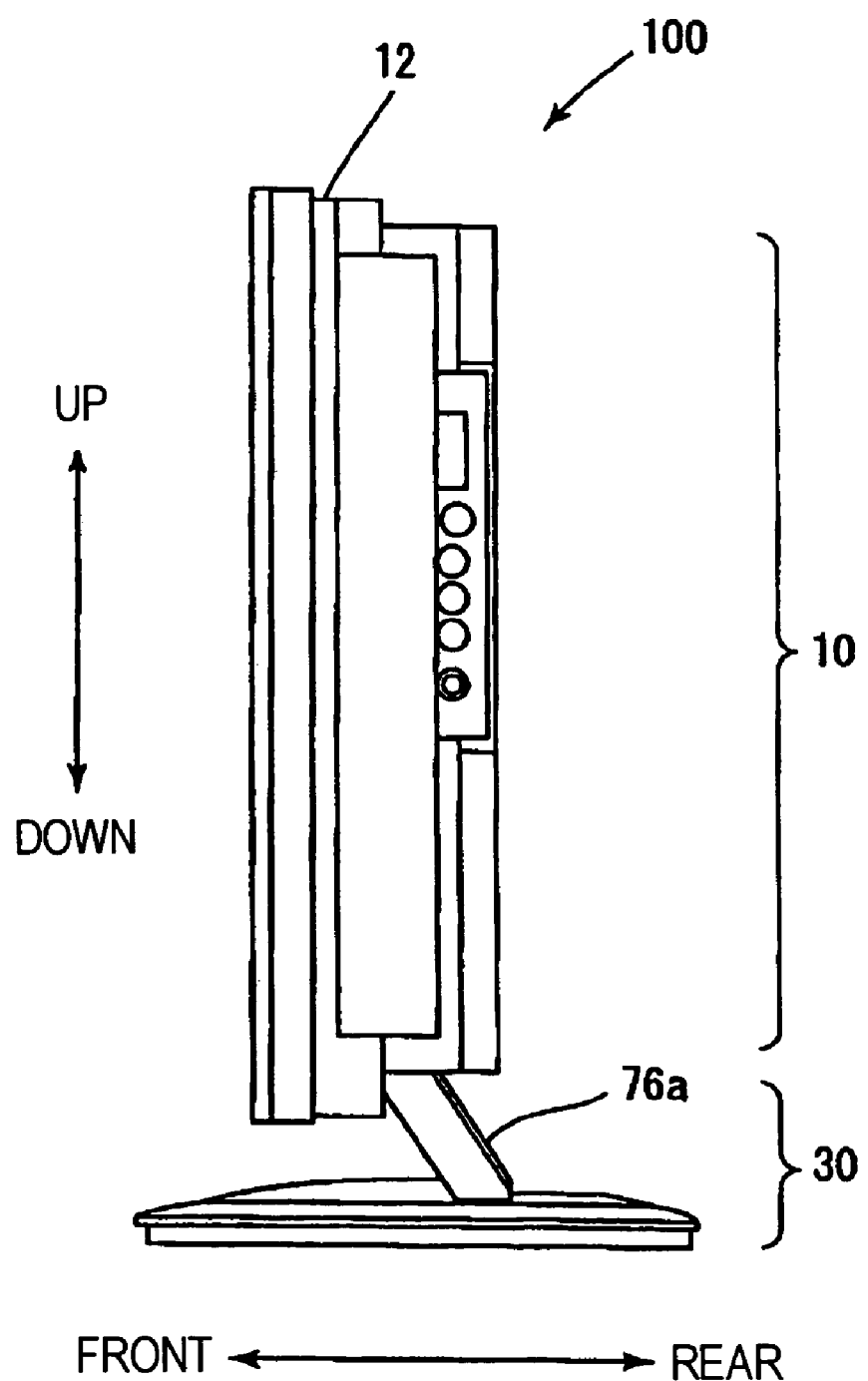
FIG. 3 is a right side elevational view of the liquid crystal television.
Figure 4:
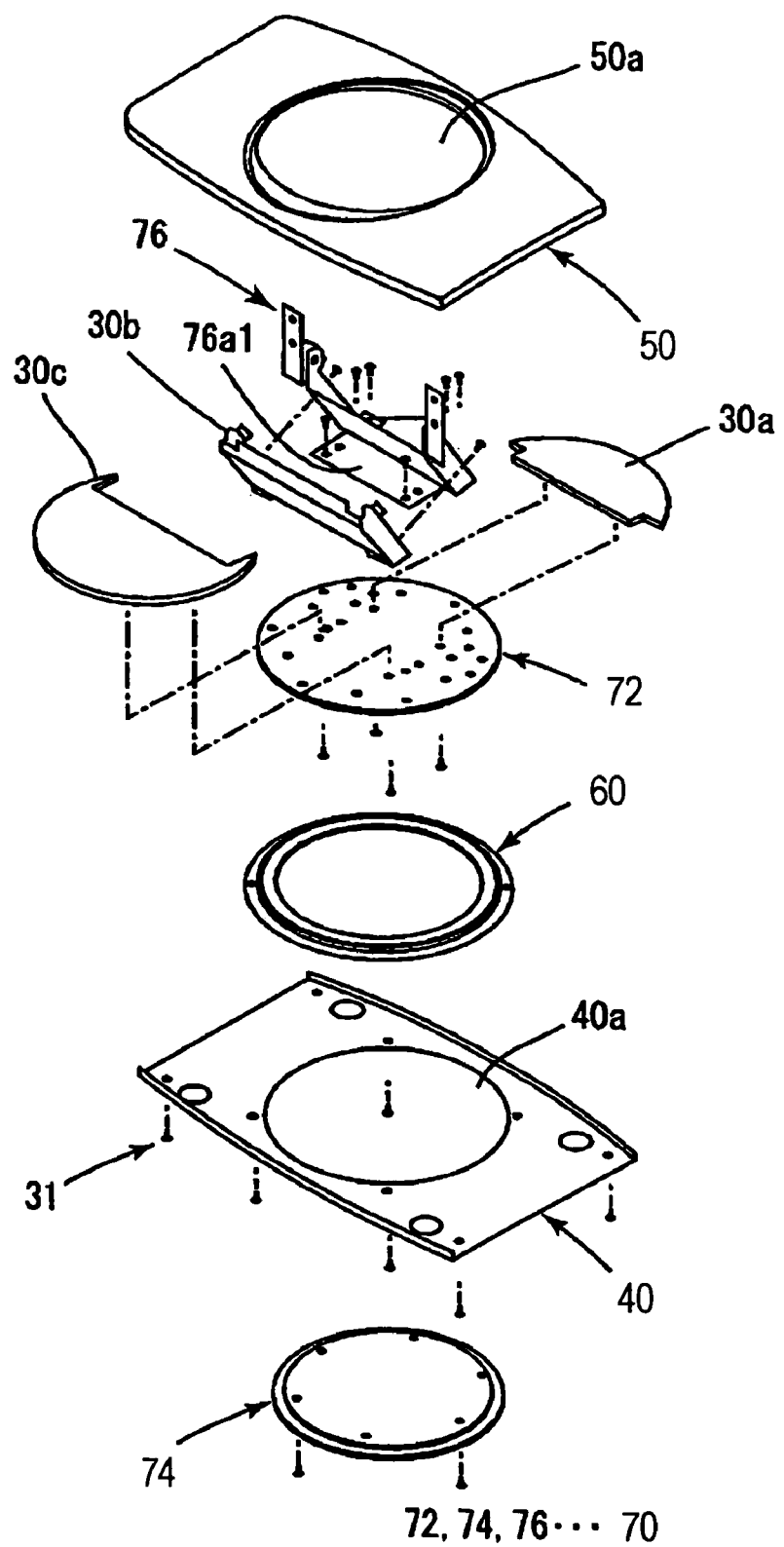
FIG. 4 is an exploded perspective view of a stand having a swivel mechanism.
Figure 5:
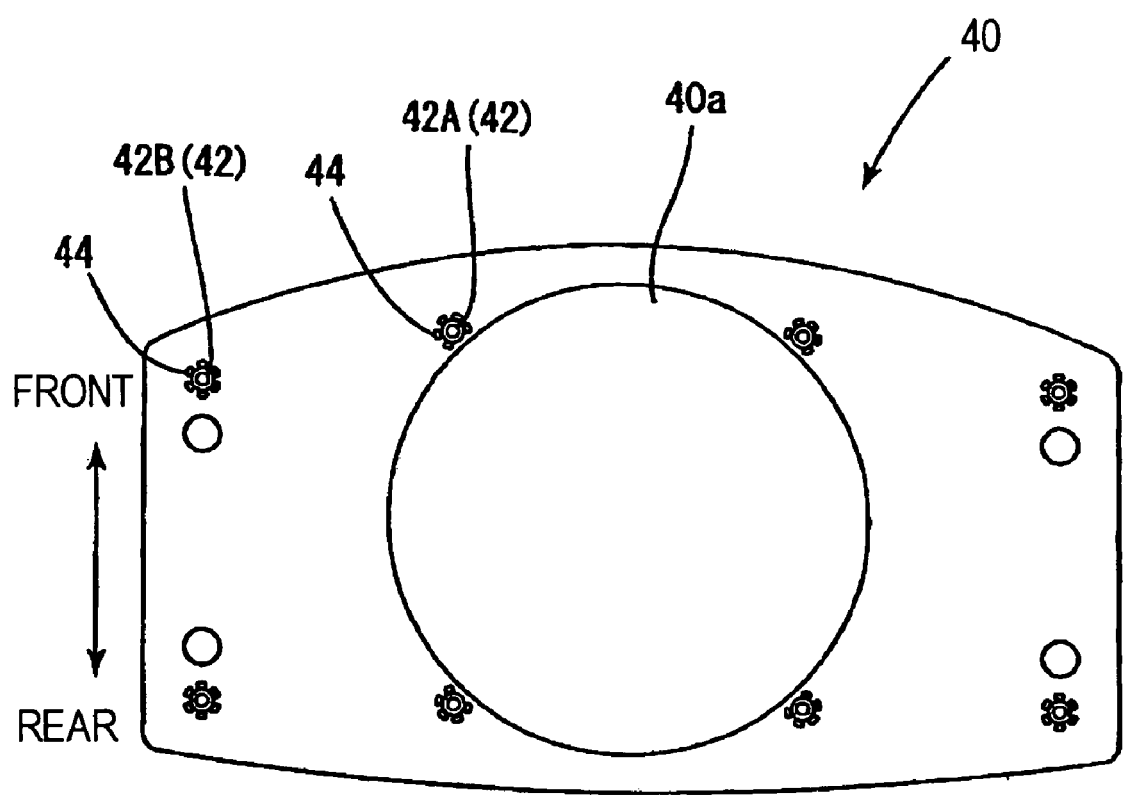
FIG. 5 is a plan view of a bottom plate member as seen from the under side.
Figure 7:
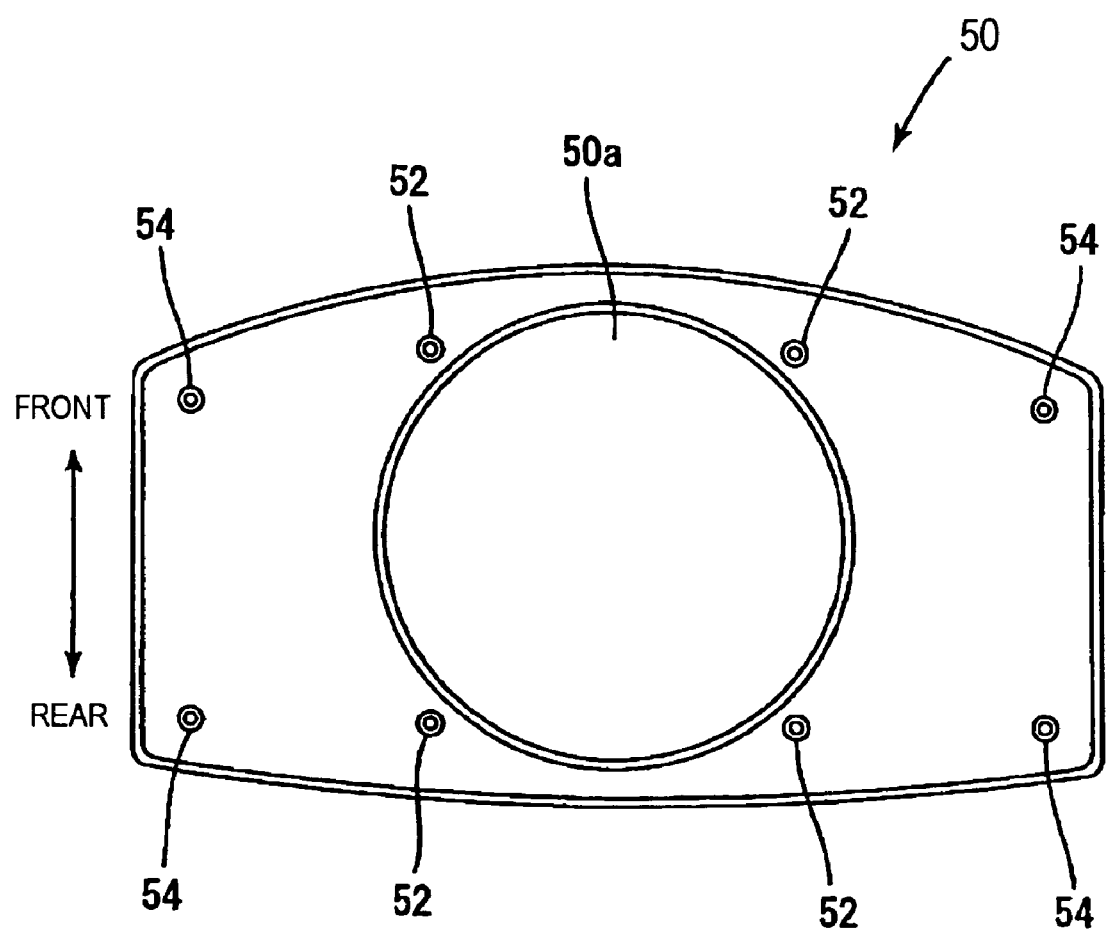
FIG. 7 is a plan view of an upper cover as seen from the under side.
Figure 8:
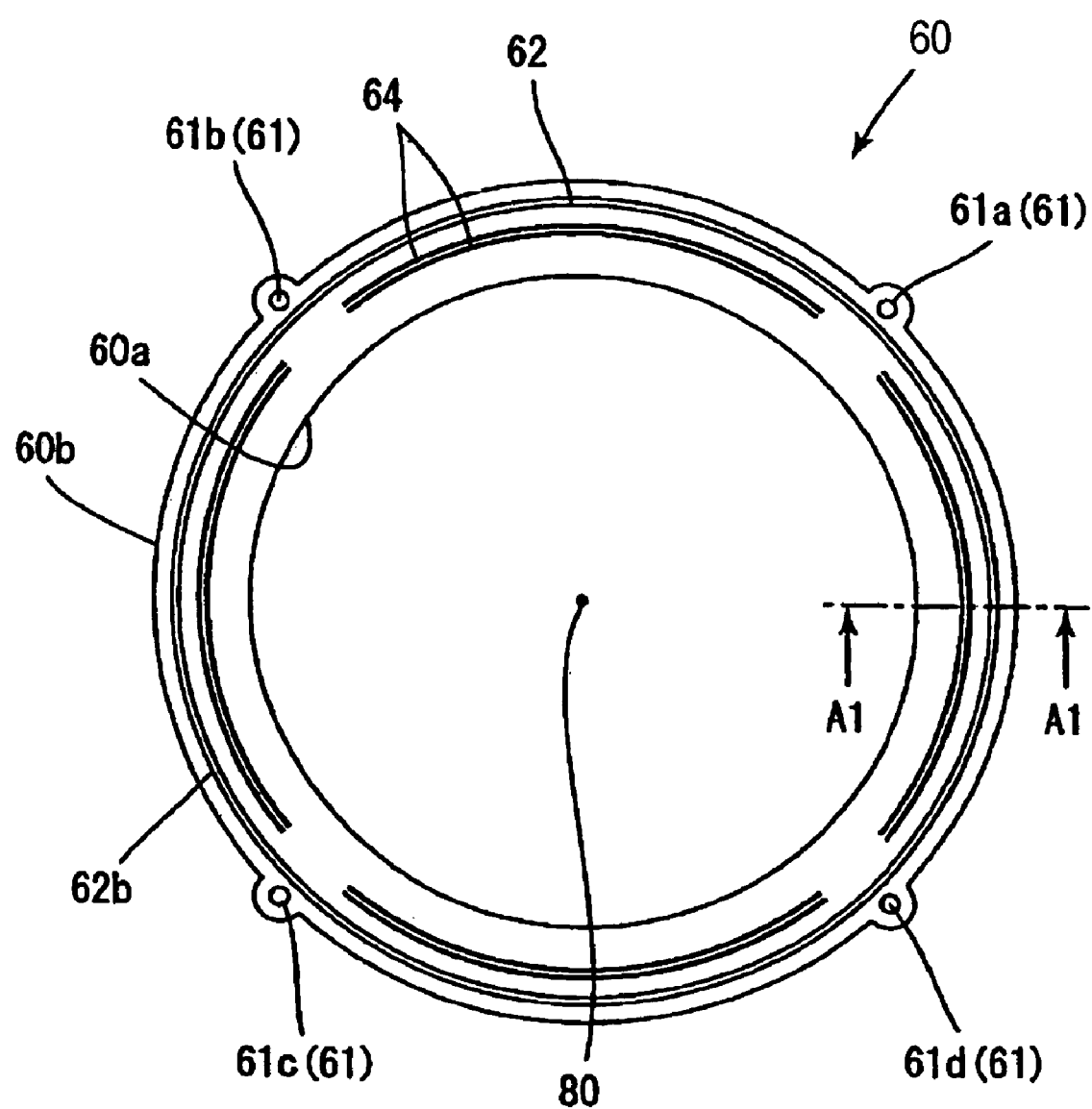
FIG. 8 is a plan view of a guide member as seen from the upper side.
Figure 9:
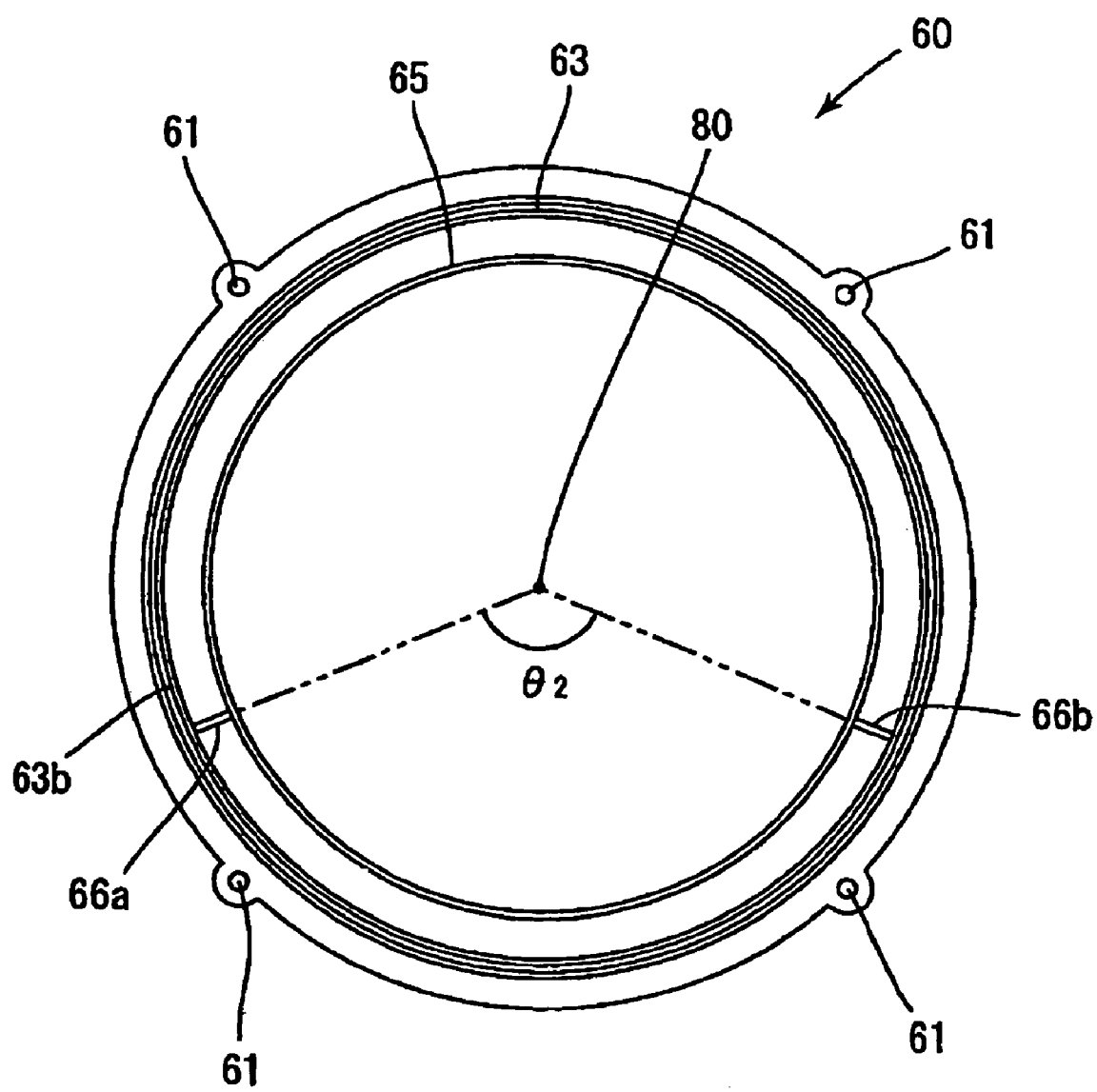
FIG. 9 is a plan view of the guide member as seen from the under side.
Figure 10:
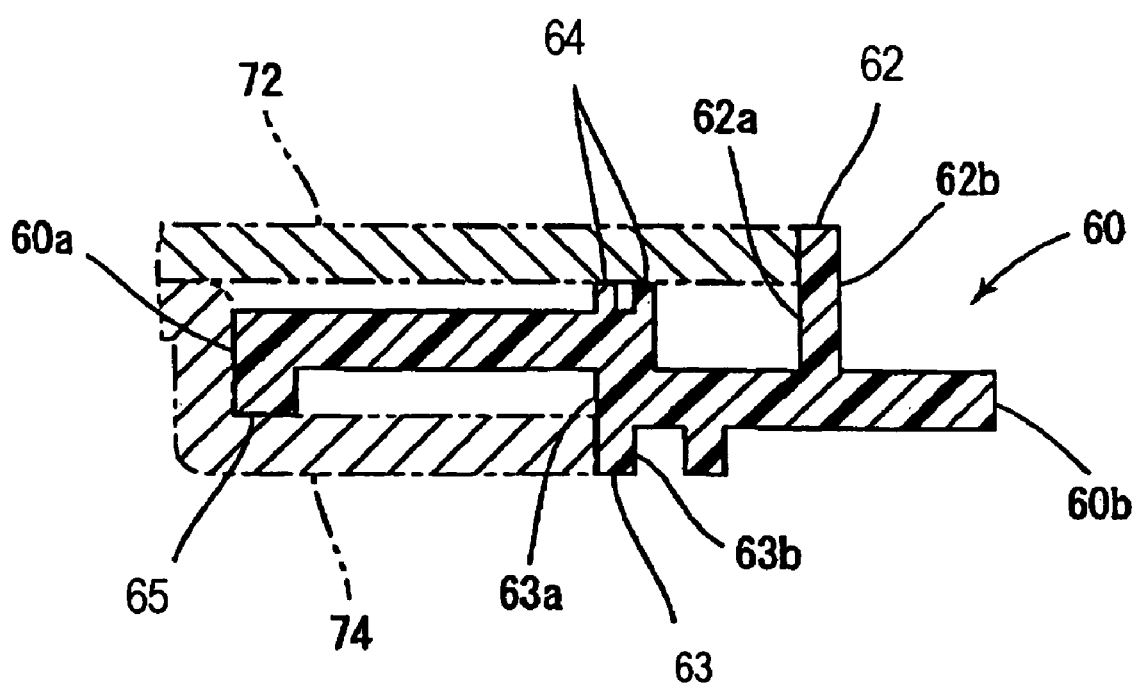
FIG. 10 is a cross-sectional view of a relevant portion of the guide member, taken along a line A1-A1 in FIG. 8.
Figure 11:
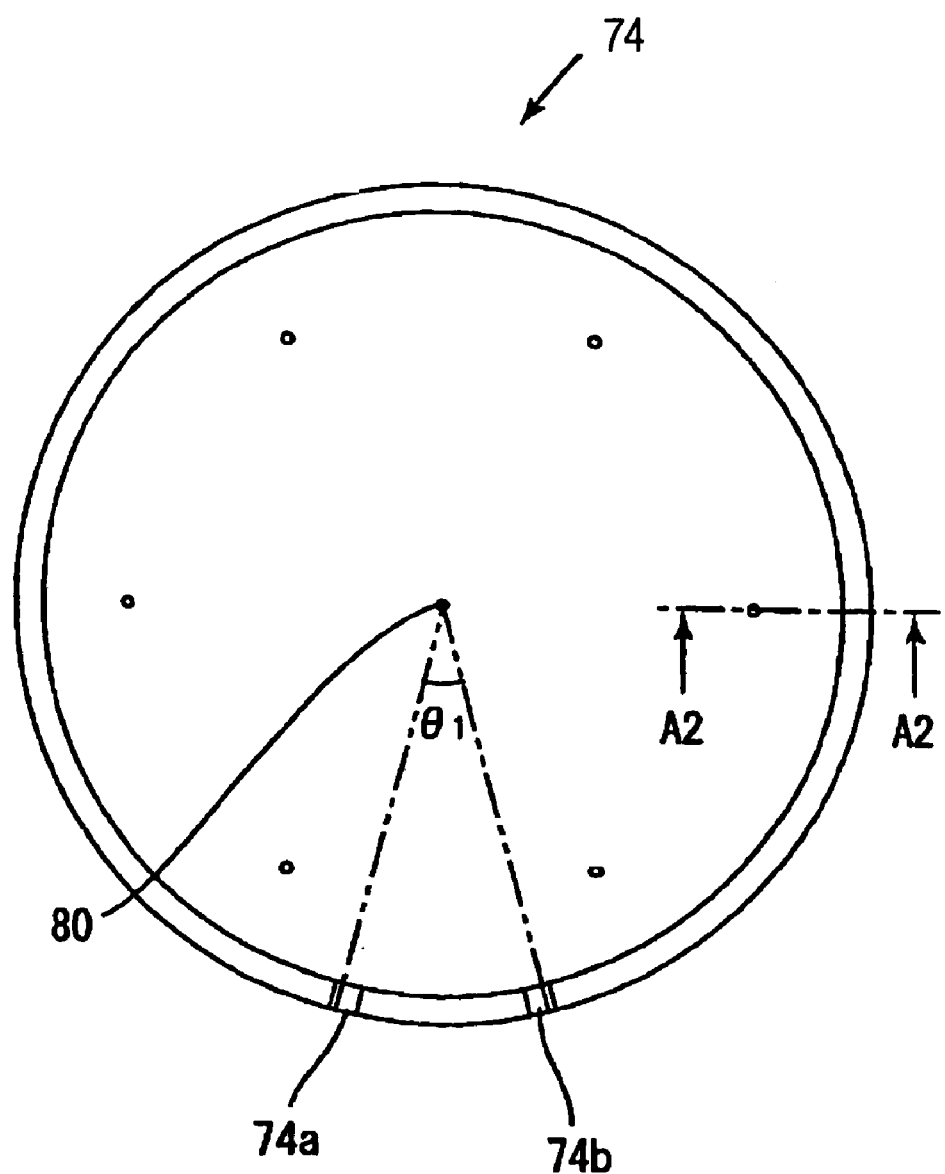
FIG. 11 is a view of a lower disk member as seen from the upper side.
Figure 12:
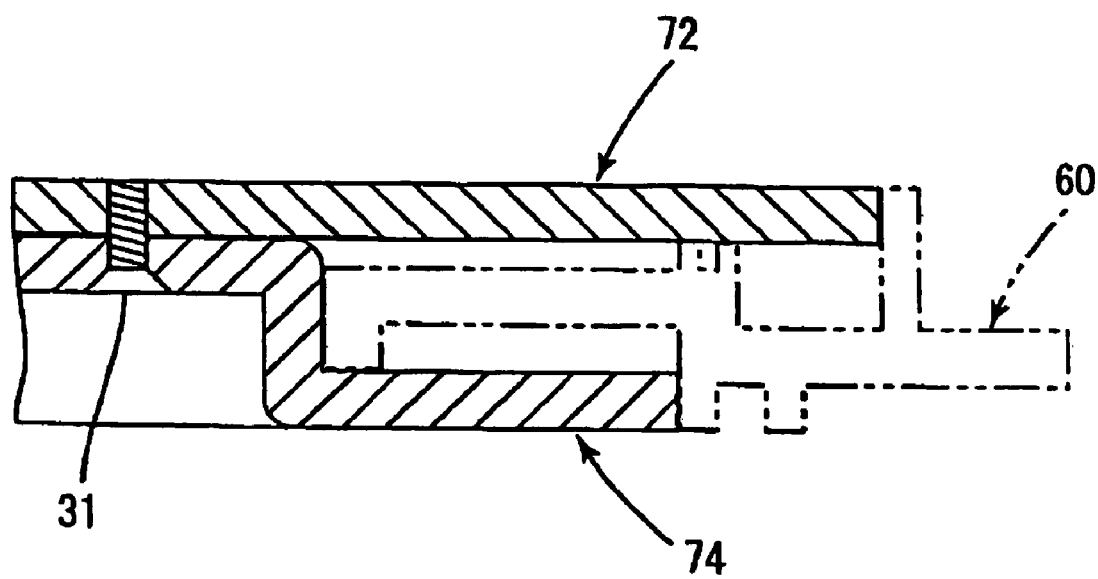
FIG. 12 is a cross-sectional view, taken along a line A2-A2 in FIG. 11, of a relevant portion of an upper disk member and the lower disk member as fixed to each other.
Figure 13:
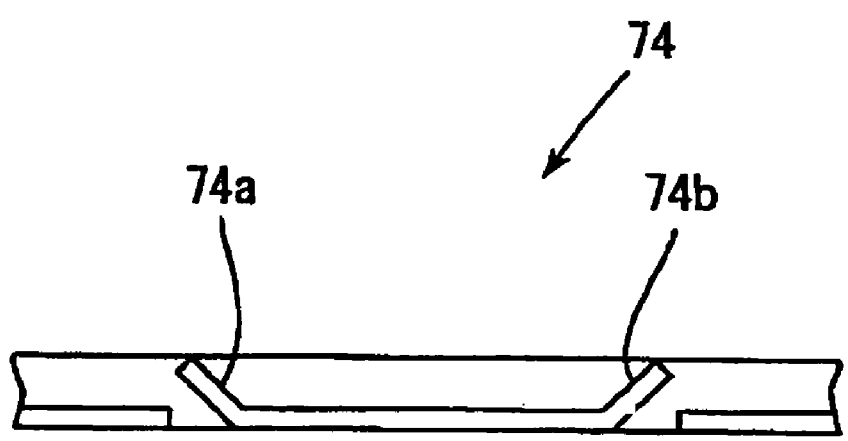
FIG. 13 is a front elevational view of upward protrusions of the lower disk member.
Figure 14:
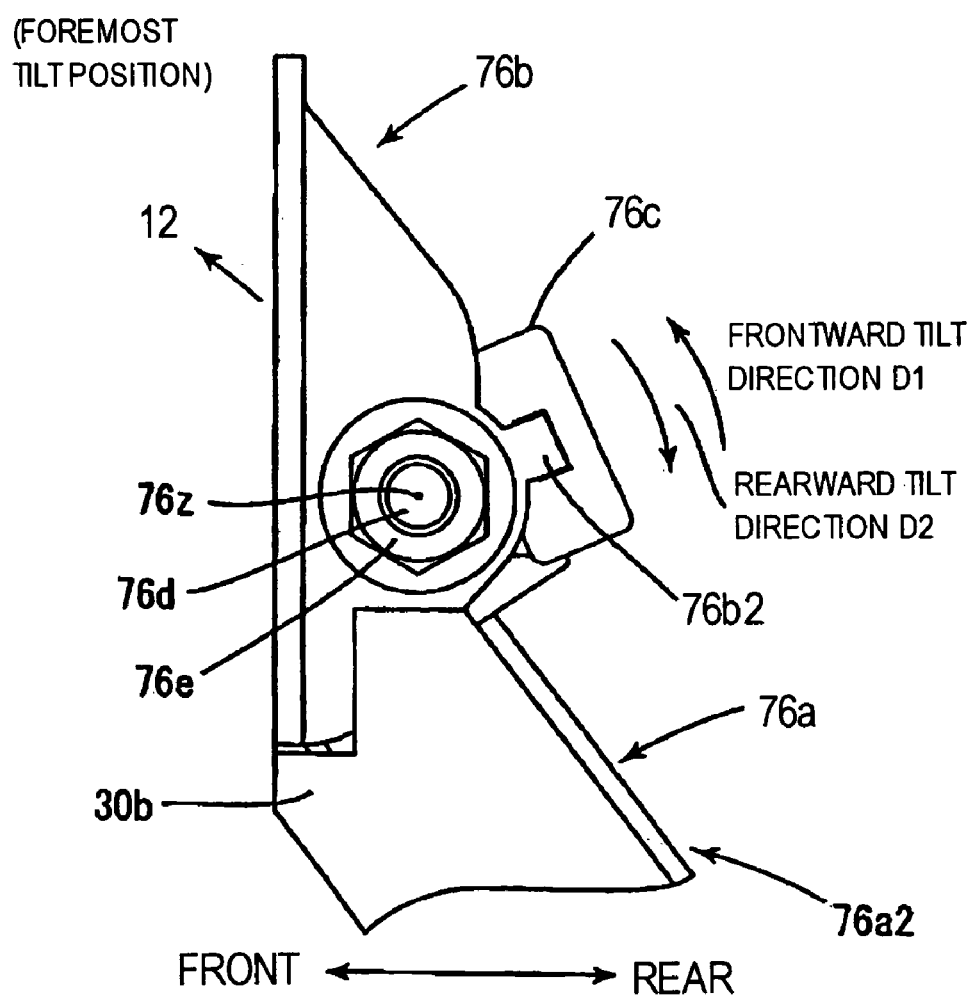
FIG. 14 is a right side elevational view of brackets and a washer-like member as assembled into a tilt mechanism.
Figure 15:
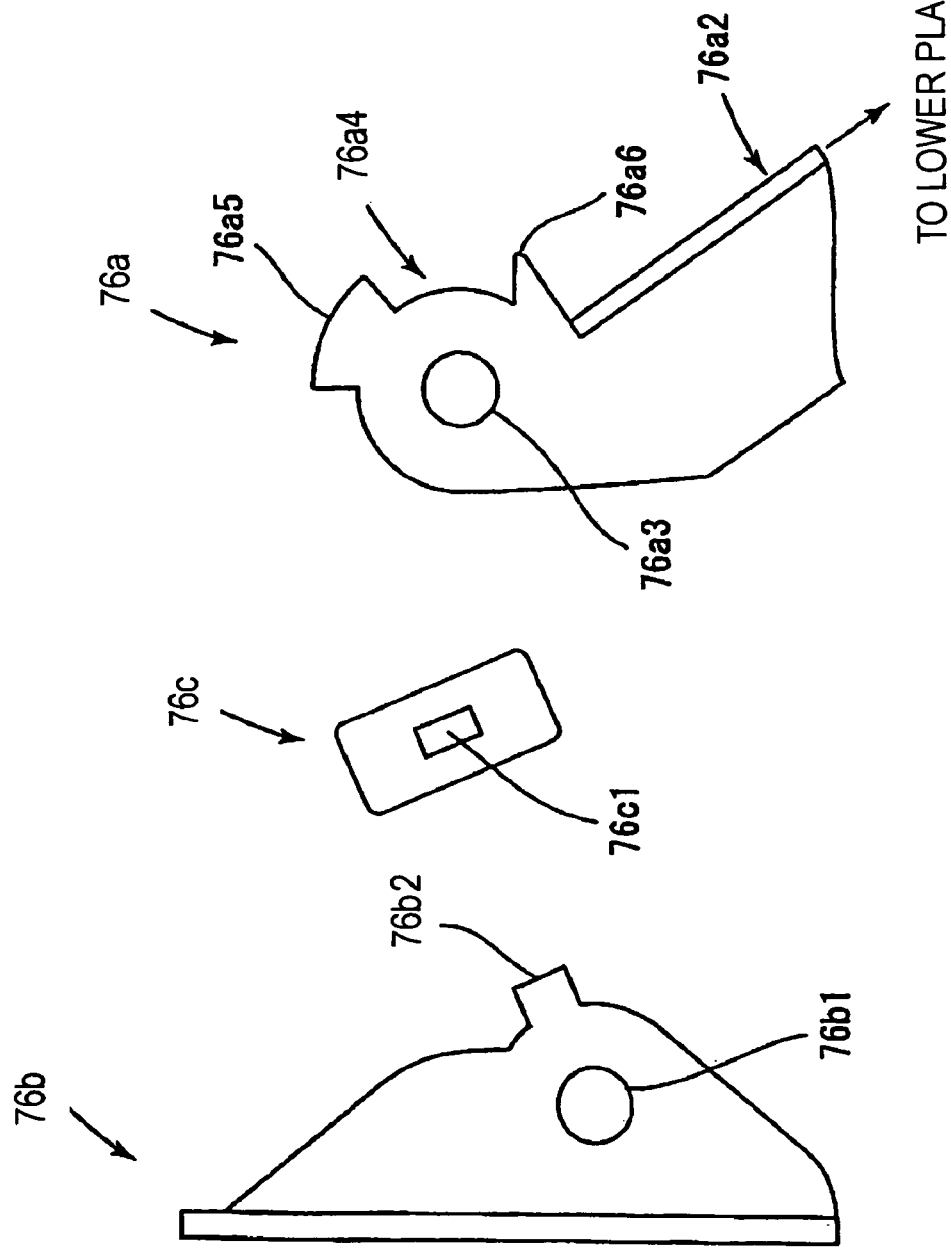
FIG. 15 is a right side elevational view of the brackets and washer-like member as exploded.

There will be described one embodiment of the invention, in the following order:
(1) Illustration of a liquid crystal display apparatus according to one embodiment of the invention
(2) Operation of the liquid crystal display apparatus
(3) Modifications of the embodiment (1) Illustration of a Liquid Crystal Display Apparatus According to One Embodiment of the Invention FIG. 1 is a front elevational view of a liquid crystal display apparatus according to one embodiment of the invention in the form of a liquid crystal television (hereinafter simply referred to as "a TV") 100. In the following description, any indicated direction is that as seen in FIG. 1. FIG. 2 is a rear view of the TV, while FIG. 3 is a right side view of the TV. FIG. 4 is an exploded perspective view of a stand 30 having a swivel mechanism. FIG. 5 is a plan view of a bottom plate member 40 as seen from the under side, while FIG. 6 is a view of relevant portions of the bottom plate member 40, showing a combination of a countersunk hole 42A and a plurality of accommodating holes 44, and a combination of a countersunk hole 42B and a plurality of accommodating holes 44, as seen from the upper side. FIG. 7 is a plan view of an upper cover 50 as seen from the under side. FIGS. 8 and 9 are plan views of a guide member 60 as seen from the upper side and from the under side, respectively. FIG. 10 is a cross-sectional view of a relevant portion of the guide member 60, taken along a line A1-A1 in FIG. 8. FIG. 11 is a view of a lower disk member 74 as seen from the upper side. FIG. 12 is a cross-sectional view, taken along a line A2-A2 in FIG. 11, of a relevant portion of an upper disk member 72 and the lower disk member 74 as fixed to each other with the guide member 60 sandwiched therebetween. FIG. 13 is a front elevational view of upward protrusions 74a, 74b of the lower disk member 74. FIG. 14 is a right side elevational view of brackets 76a, 76b and a washer-like member 76c as assembled into a tilt mechanism. In FIG. 14 is shown a right side one of two tilt mechanisms in the TV which are arranged in the left-right direction and symmetrical to each other in the same direction. FIG. 15 is a right side elevational view of the brackets and washer-like member constituting the right-side tilt mechanism, as exploded.

The TV 100 comprises the stand (or base) 30, and a main body 10 supported by the stand such that the main body 10 is capable of swiveling and tilting with respect to the stand 30. The main body 10 comprises a housing or cabinet 12 formed of a resin. The main body comprises a receiver portion for receiving broadcast signals, a printed circuit board in which a control circuit is formed, and a liquid crystal display circuit having a liquid crystal display surface 14. The cabinet 12 has in its front face an opening formed correspondingly to the liquid crystal display surface, and accommodates the receiver portion, printed circuit board, and others. The control circuit implemented in the circuit board operates to receive airwaves, and signals in a given format inputted through an external input terminal, and display images on the liquid crystal display surface and output sounds by means of an audio output portion. The cabinet 12 has a shape such that its lateral dimension is larger than its vertical dimension, corresponding to the shape of the liquid crystal display circuit, and its depth dimension is significantly smaller than the lateral and vertical dimensions. The main body 10 displays images on its liquid crystal display surface 14, and is supported to be rotatable with respect to the stand 30 around a rotation axis 80 extending in a vertical direction (that is, the direction along which the main body and the stand are aligned).

As shown in FIG. 4, the stand 30 comprises a bottom plate member 40, an upper cover 50, a guide member 60, and a support unit 70. The bottom plate member 40 is formed of a metal such as a stainless steel and disposed at the bottom of the stand 30. The upper cover 50, which corresponds to an opposed member, is made of a resin and fixed to the bottom plate member 40 by screws. The guide member 60 is formed of a resin and annular. The support unit 70 is formed of a metal and supported by the guide member 60 to be rotatable with respect to and along the guide member 60 so as to support the main body 10.

The bottom plate member 40 is planar and horizontally disposed. The lateral dimension of the bottom plate member 40 is larger than its dimension in the front-rear direction. The bottom plate member 40 has a plurality of countersunk holes 42A, 42B, which are formed such that a plurality of through-holes 42a for inserting respective screws 31 are initially formed in a metal sheet such as of a stainless steel, by punching, and then countersinks 42b are formed for respective through-holes 42a by pressing, that is, by plastically deforming a periphery of an open end of each of the through-holes 42a which is open on a surface of the metal sheet to be a lower surface of the bottom plate member. More specifically, four countersunk holes 42A are formed around and in the vicinity of an opening 40a formed through the bottom plate member 40 to have a diameter slightly smaller than an external diameter of the lower disk member 74, and four countersunk holes 42B are formed in the vicinities of the four corners of the bottom plate member 40.

The upper cover 50 is formed of a resin by injection molding. A lower surface of the upper cover 50, which is the surface opposed to an upper surface of the bottom plate member 40 which is opposite to its lower surface in which the countersinks 42b are formed, has four first screw holes 52 formed at respective positions corresponding to the countersunk holes 42A formed around and in the vicinity of the opening 40a, and four third screw holes 54 formed at respective positions corresponding to the countersunk holes 42B formed in the vicinities of the four corners of the bottom plate member 40. With the third screw holes 54 thus formed, the upper cover 50 is fixed at its lower surface to the bottom plate member 40 by eight screws 31 at positions radially outward of the annular guide member 60. That is, the positions of the first screw holes 52 correspond to the countersunk holes 42A while the positions of the third screw holes 54 correspond to the countersunk holes 42B, and each of first four of the screws 31 is inserted through one of the countersunk holes 42A and a corresponding one of the first screw holes 52, while each of the second four of the screws 31 is inserted through one of the countersunk holes 42B and a corresponding one of the third screw holes 54.

The annular guide member 60 is formed of a resin by injection molding. The resin may be an alkylbenzene sulfonic acid (ABS) resin to which a polycarbonate (PC) is added to enhance a mechanical strength of the guide member 60. The guide member 60 has four second screw holes 61 formed therethrough at respective positions corresponding to the countersunk holes 42A formed in the bottom plate member 40, and the first screw holes 52 formed in the upper cover 50, so that the guide member 60 is fixed between the bottom plate member 40 and the upper cover 50 by inserting the first four screws 31 into the countersunk holes 42A, second screw holes 61, and third screw holes 52, respectively, and tightening the screws 31. The thus fixed guide member 60 is held in horizontal position with its center on the vertically extending rotation axis 80.

The positions of combinations each consisting of one of the countersunk holes 42A and the corresponding first and second screw holes 52, 54 are symmetric with respect to the center point of the guide member 60 (i.e., the point in the plane in which the guide member 60 extends, through which the rotation axis 80 extends). As shown in FIG. 8, countersunk holes 61a and 61c are symmetrically positioned with respect to the rotation axis 80, while countersunk holes 61b and 61d are symmetrically positioned with respect to the rotation axis 80. Accordingly, the degree of deformation of the guide member 60 upon screwing thereof is lowered, enhancing the smoothness of swiveling of the main body 10.

In addition to the four second screw holes 61, the guide member 60 has an upper extending portion 62 and an upper contact portion 64 on its upper side, and a lower extending portion 63, a lower contact portion 65, and a first rib 66a and a second rib 66b on its under side. The upper extending portion 62 is formed to extend upward along the entire circumference, at a radial position outward of an inner circumferential surface 60a of the guide member 60 but inward of an outer circumferential surface 60b thereof. The lower extending portion 63 is formed to extend downward along the entire circumference, at a radial position outward of the inner circumferential surface 60a but inward of the outer circumferential surface 60b. The upper contact portion 64 is formed to extend upward intermittently along the entire circumference in the circumferential direction, at a radial position outward of the inner circumferential surface 60a but inward of an inner circumferential surface 62a of the upper extending portion 62. The lower contact portion 63 is formed to extend downward along the entire circumference, at a radial position outward of the inner circumferential surface 60a but inward of an inner circumferential surface 63a of the lower extending portion 63. The second screw holes 61 are formed at respective positions radially outward of an outer circumferential surface 62b of the upper extending portion 62 and an outer circumferential surface 63b of the lower extending portion 63. The first and second ribs 66a, 66b are formed to extend downward from the lower surface of the guide member 60 at respective positions spaced at a rotation angle θ2, which corresponds to a second rotation angle, such that the ribs 66a, 66b respectively extend inward from the lower extending portion 63.

The support unit 70 comprises an upper disk member 72, a lower disk member 74, and a support member 76, each of which 72, 74, 76 is formed of a metal such as a stainless steel.

The upper disk member 72 is a circular planar member whose diameter is larger than that of the inner circumferential surface 60a of the annular guide member 60, but smaller than that of the inner circumferential surface 62a of the upper extending portion 62. The upper disk member 72 and the lower disk member 74 have a plurality of screw holes at the corresponding positions, so that the upper and lower disk members 72, 74 are fixable to each other by the screws 31, with a lower surface of the upper disk member 72 in contact with a part of an upper surface of the lower disk member 74 which is radially inward of the inner circumferential surface 60a of the annular guide member 60. The upper disk member 72 and the support member 76 have a plurality of screw holes at the corresponding positions, so that the upper disk member 72 and the support 76 are fixable to each other by screws, with an upper surface of the upper disk member 72 in contact with a lower surface of the support member 76. When fixed, the upper disk member 72 is in a horizontal position and centered on the rotation axis 80, with its lower surface in contact with an upper end of the upper contact portion 64 of the guide member 60. By this arrangement, a contact area at which the fixed guide member contacts the rotatable upper disk member is relatively small, enabling the main body 10 to further smoothly swivel.

The lower disk member 74 is a circular planar member having an outer diameter larger than the diameter of the inner circumferential surface 60a of the annular guide member, and smaller than the inner circumferential surface 63a of the lower extending portion 63 of the guide member 60. The upper surface of the lower disk member 74 is fixed, at its part radially inward of the inner circumferential surface 60a of the annular guide member 60, to the lower surface of the upper disk member 72. When fixed, the lower disk member 74 is disposed in a horizontal position and centered on the rotation axis 80, and at least a radial part of the lower disk member 74 between the inner circumferential surface 60a and the inner circumferential surface 63a of the lower extending portion 63 of the guide member 60 is disposed under the guide member 60 such that the upper surface of the lower disk member 74 contacts a lower end of the lower contact portion 65. According to this arrangement, a contact area between the fixed guide member and the rotatable lower disk member is relatively small, enabling the main body to further smoothly swivel.

The support member 76 comprises parts 76a-76e, and is fixed on the upper surface of the upper disk member 72 to support the main body 10. Reference numeral 76a denotes a stand bracket which has a horizontal lower planar part 76a1 and an upper planar part 76a2 extending obliquely upward from a position in the lower planar part 76a1 on the front side of a rear edge of the lower planar part 76a1. A decorative cover 30b is attached to the bracket 76a with the lower planar part 76a1 frontward inserted in a lower portion of the cover 30b from its rear side. Then, the lower planar part 76a1 of the bracket 76a is screwed to the upper surface of the upper disk member 72, and decorative covers 30a, 30c are screwed to a rear side portion and a front side portion of the lower planar part 76a1, respectively. The guide member 60 sandwiched between the upper and lower disk members 72, 74 is placed on the bottom plate member 40 in position with respect to the opening 40a of the bottom plate member 40. In this state, the upper cover 50, which has the circular opening 50a whose diameter is larger than that of the upper disk member 72 but smaller than the outer diameter of the guide member 60 and is such that the bracket 76a can be disposed inside the opening 50a, is placed on the guide member 60 and secured to the bottom plate member 40 by the screws. Thus, the guide member 60 sandwiched between the upper and lower disk members 72, 74 is rotatably interposed between the bottom plate member 40 and the upper cover 50.

A set of a bolt 76d and a nut 76e is attached to the stand bracket 76a and each of a pair of main body brackets 76b, such that the bolt 76d and nut 76e are rotatable around a rotation axis 76z relatively to the brackets 76a, 76b. A pair of vertical planar parts are formed in the upper planar part 76a2 of the stand bracket to extend in the front-rear direction, and a through-hole 76a3 is formed through each of the vertical planar parts. Each vertical planar part has a first protrusion 76a5 protruding slightly rearward from an upper side thereof, and a second protrusion 76a6 protruding rearward, thereby forming a circular cutout or groove 76a4 at the rear side of the vertical part between the first protrusion 76a5 and second protrusion 76a6.

Each of the mainbody brackets 76b has a pair of vertical planar parts each extending in the front-rear direction and having a through-hole 76b1 through which the bolt 76d is inserted. Each vertical part has a pawl 76b2 protruding from the rear side thereof and bent toward the stand bracket 76a along the direction of the rotation axis 76z. The pawl 76b2 is inserted through the through-hole 76c1 of the washer-like member 76c.

The stand bracket 76a and the each mainbody bracket 76b are disposed around and along the rotation axis 76z with the each of the bolts 76d inserted through the through-holes 76a3, 76b1, such that the stand bracket 76a and the each of the mainbody brackets 76b are rotatable relatively to each other around the rotation axis 76z. The washer-like member 76c is interposed between the bracket 76a and the each mainbody bracket 76b.

The grooves 76a4 of the stand bracket delimits the rotation of the pawls 76b2 of the mainbody brackets to a range in such a way that each pawl 76b2 engages with the corresponding groove 76a4 and is brought into contact with opposite ends of the groove 76a4 when the stand bracket 76a and each mainbody bracket 76b are rotated relatively to each other in two opposite directions D1, D2 around the rotation axis 76z. When the main body 10 is tilted in the forward direction D1 with the each pawl 76b2 brought into contact with the first protrusion 76a5, the pawl 76b2 and main body 10 are placed in their foremost tilt position as shown in FIG. 14, and when the main body 10 is tilted in the rearward direction D2 with the each pawl 76b2 brought into contact with the second protrusion 76a6, the pawl 76b2 and the main body 10 are placed at their rearmost tilt position.

The support unit 70 is supported rotatably with its upper disk member 72 and lower disk member 74 sandwiching a part of the guide member 60 located radially inward of the inner circumferential surface 62a of the upper extending portion 62 and the inner circumferential surface 63a of the lower extending portion 63, and supports the main body 10 at its support member 76. Thus, the main body 10 is capable of tilting and swiveling with respect to the support member 76.

The metal upper disk member is placed on a part of the upper surface of the annular guide member which is radially inward of the upper extending portion while the metal lower disk member is placed on a part of the lower surface of the annular guide member which is radially inward of the lower extending portion, and the metal support unit is supported with its upper and lower disk members sandwiching the radially inner part of the annular guide member such that the metal support unit is rotatable relatively to the guide member. Therefore, the main body is enabled to further smoothly swivel.

A first upward protrusion 74a and a second upward protrusion 74b protrude upward from the upper surface of the lower disk member 74 at respective places including an extreme circumferential edge of the lower disk member, and angularly spaced from each other at a first rotation angle θ1 with respect to the rotation axis 80. The angle θ2 formed between the ribs 66a, 66b in the guide member 60 is larger than the rotation angle θ1, so that the upward protrusions 74a, 74b are inserted between the ribs 66a, 66b. The support unit 70 is supported to be rotatable with respect to the annular guide member 60 with the upward protrusions 74a, 74b inserted between the ribs 66a, 66b, thereby reliably limiting the range of swiveling of the main body 10 with a simple structure.

The countersunk holes 42A for fixing the bottom plate member 40 to the guide member 60 as well as the upper cover 50, one of which is shown in the upper side in FIG. 6, are formed at respective positions corresponding to the combinations each consisting of one of the first screw holes 52 in the upper cover 50 and a corresponding one of the screw holes 61 in the guide member 60, while the countersunk holes 42B for fixing the bottom plate member 40 to only the upper cover 50 are formed at respective positions corresponding to the third screw holes 54. Concurrently with punching out through-holes 42a, there are also punched out six accommodating holes 44 concentrically around each of the through-holes 42a to be the countersunk holes 42B, and five accommodating holes 44 concentrically around each of the through-holes 42a to be the countersunk holes 42A in the vicinity of the opening 41.

The countersunk holes 42A, 42B and accommodating holes 44 in the bottom plate member 40 are formed as follows.

In a first step, as shown in FIG. 16, there are formed by pressing or punching using a punch 91 and a die 92 in a metal sheet to be the bottom plate member 40, a plurality of the through-holes 42a for inserting the screws, as well as a plurality of the accommodating holes 44 around each of the through-holes 42a for accommodating plastic flow of metal forming the metal sheet upon pressing in a second step to follow. It is noted that the upper and lower sides of the bottom plate member 40 as seen in FIG. 16 are the under and upper surfaces thereof. Then, the countersinks 42b are formed on the under surface of the bottom plate member 40 at respective open ends of the through-holes 42a, by pressing, using another punch 93 and die 94, causing plastic flow of the material forming the metal sheet. In this way, the countersunk holes 42A, 42B free from the material rise therearound and a plurality of the accommodating holes 44 are formed. That is, the bottom plate member 40 has a plurality of combinations each comprising a countersunk hole 42 and a plurality of the accommodating holes 44, and the material rise around the countersunk holes 42 is prevented by forming the countersunk holes 42 such that first the through-holes 42a for inserting the screws, and the accommodating holes 44 therearound for accommodating the plastic flow of metal in the subsequent pressing step, are formed in the metal sheet by punching, and subsequently the countersinks 42b are formed by pressing at the open ends of the respective through-holes 42a on the lower surface of the bottom plate member 40.

Formed of a resin, the guide member 60 deforms when the amount of insertion or tightening varies among the screws. In the conventional arrangement without the accommodating holes 44, the material rise occurs around a countersunk hole, as shown in FIG. 18, causing a variation in the amount of tightening of the screws, which leads to unsmooth swiveling of the main body. On the other hand, according to the invention where the material rise around the through-holes 42*a* is eliminated, the annular guide member 60 formed of a resin is screwed with high precision to the bottom plate member 40 and the upper cover 50. Accordingly, the guide member 60 is free from a slight deformation, enabling the main body 10 to smoothly swivel.

Where the plurality of the accommodating holes 44 are formed around each through-hole 42*a* such that each of the accommodating holes 44 is spaced from the through-hole 42*a* by a distance d2 which is ⅕ to 1 times a diameter d1 of the through-hole 42*a*, the guide member is further precisely screwed, enabling to further smoothly swivel the main body. This is because of that where the distance d2 is equal to or larger than ⅕ of the diameter dl of the through-hole 42*a*, the circumference of the through-hole 42*a* and the circumference of each of the accommodating holes therearound is sufficiently distant in view of the second step, assuring a sufficient mechanical strength of the countersunk holes, and where the distance d2 is equal to or smaller than the diameter dl, the material rise around the through-hole 42*a* is reliably prevented.

Where each of a minor diameter d3 and a major diameter d4 of each of the accommodating holes 44 formed around each of the through-holes 42*a* and having an oblong shape is ¼ to ¾ of the diameter dl of the through-hole 42*a*, the guide member 60 is screwed with a further enhanced precision, enabling further smooth swiveling of the main body 10. This is because that where each of the minor and major diameters d3, d4 of each accommodating hole 44 is ¼ of the diameter dl of the through-hole 42*a* or larger, the material rise around the through-hole 42*a* is reliably prevented, and where each of the diameters d3, d4 is ¾ of the diameter dl or smaller, an amount of the material assuring a sufficient mechanical strength of the countersunk holes is present around the through-hole 42*a*.

Further, where at least a part of the accommodating holes 44 formed around each through-hole 42*a* are spaced from an adjacent other by a distance d5 which is ⅕ to 1 times the diameter d1 of the through-hole 42*a*, the guide member 60 is screwed with a further enhanced precision, enabling further smooth swiveling of the main body. This is because of that where the distance d5 is ⅕ of the diameter d1 or larger, each adjacent two of the accommodating holes 44 are separated by a distance sufficient in view of the second step, namely, a distance assuring a sufficient mechanical strength of the countersunk holes, while where the distance d5 is equal to or smaller than the diameter d1, the material rise around the through-hole 42*a* is reliably prevented.

(2) Operation of the Liquid Crystal Display Apparatus

To produce the bottom plate member 40, the through-holes 42*a* and the accommodating holes therearound are initially formed in the metal sheet by pressing, or punching using the punch 91 and die 82 as the first step as shown in FIG. 16. Subsequently, the countersinks 42*b* are formed on the lower surface of the bottom plate member 40 at the open ends of the through-holes 42*a* by pressing using another punch 93 and die 94, as the second step. In this second step, the material flows into the accommodating holes 44 formed around the through-holes 42*a*, causing no material rise around the through-holes 42*a*. Hence, the annular guide member is screwed with high precision. In this way, the annular guide member 60 formed of a resin is screwed with high precision, eliminating the slight deformation of the guide member and enabling smooth swiveling of the main body.

Since in addition to the accommodating holes 44 formed around the countersunk holes 42A for directly screwing the annular guide member 60, the accommodating holes 44 are also formed around the countersunk holes 42B on the radially outer side of the guide member 60, the material rise does not occur around the countersunk holes 42B. If a material rise occurs around any of the countersunk holes 42B upon forming the countersunk holes 42B for screwing the bottom plate member 40 only to the upper cover 50, between which members 40, 50 the guide member 60 is interposed, the guide member 60 may slightly deform. According to the invention, however, the guide member 60 can be screwed with an enhanced precision, preventing the slight deformation of the guide member 60 with an enhanced reliability, and in turn enabling further smooth swiveling of the main body 10.

In this embodiment, the metal upper disk member 72 is placed on the upper surface of the annular guide member 60 at the radial part inward of the upper extending portion 62 while the metal lower disk member 74 is placed on the lower surface of the guide member 60 at the radial part inward of the lower extruding portion 63, that is, the metal support unit 70 is supported to be rotatable relatively to the guide member 60 with its upper and lower disk members 72, 74 sandwiching a radially internal portion of the guide member 60, while the contact area of the fixed guide member 60 with the rotatable disk members 72, 74 is relatively small. Therefore, the main body supported by the support unit 70 is further smoothly swiveled.

(3) Modifications of the Embodiment

Various modifications may be made to the embodiment.

Although the liquid crystal television of the invention is preferably small to medium sized with its screen size under about 25-inch so that the television is light weighted and easily swiveled, the television may be medium to large sized. The television may be a liquid crystal television incorporating a video cassette recorder, a DVD player, and/or others. Further, the invention is applicable to a liquid crystal display which does not include a tuner or receiver for receiving airwaves, and also to a liquid crystal display which includes a tuner.

Figure 17:
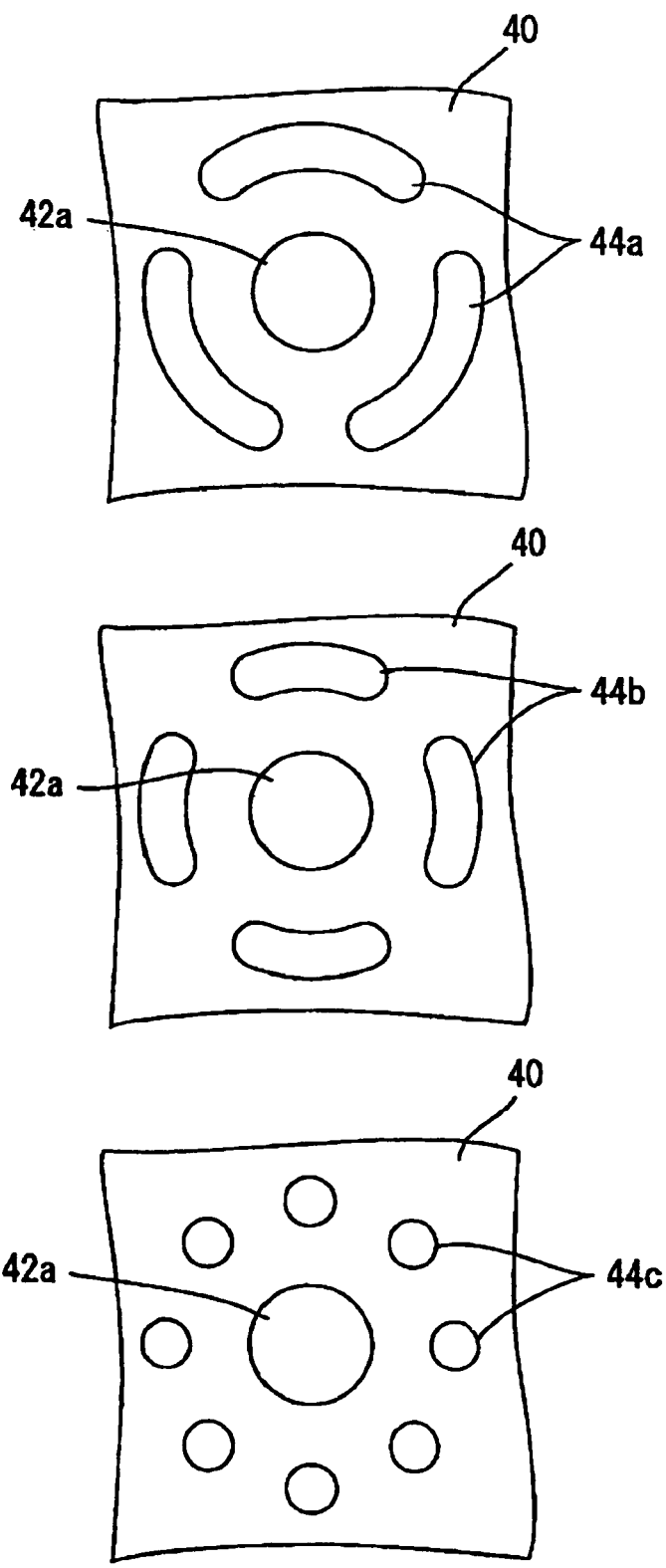
FIG. 17 shows modifications of the accommodating holes as seen from the upper side.

The number and shape of the accommodating holes 44 formed around the through-holes 42*a* may be otherwise. Examples of the accommodating holes 44 as modified are shown in FIG. 17. In the upper portion of FIG. 17 is shown a first example where three accommodating holes 44*a* are arranged around a thorough-hole 42*a* in a circle centered on the through-hole 42*a*. A second example shown in the middle of FIG. 17 is such that four accommodating holes 44*b* are arranged around a thorough-hole 42*a* in a circle centered on the through-hole 42*a*. A third example shown at the bottom of FIG. 17 is such that eight accommodating holes 44*c* are arranged concentrically around a thorough-hole 42*a* in a circle centered on the through-hole 42*a*.

It is preferable that a plurality of the accommodating holes are formed around each through-hole to reliably flow the material around the through-hole into the accommodating holes in order to prevent the material rise. However, even where only a single accommodating hole is formed in the vicinity of the through-hole, the effect of preventing the material rise is obtained, enabling smooth swiveling of the main body.

Further, the effect of smoothing the swiveling of the main body is obtained where the accommodating holes 44 are formed for only the countersunk holes 42A for screwing the guide member as well as the upper cover, and not for the countersunk holes 42B for screwing the upper cover only.

In each of the modifications, the same operation and effects as those of the above-described embodiment can be obtained, that is, smooth swiveling of the main body is enabled.

I claim:

1. A liquid crystal television comprising:
a main body capable of swiveling around a vertically extending rotation axis, and comprising:
a resin cabinet; and
a liquid crystal display surface for presenting images thereon; and
a stand comprising:
a metal bottom plate member disposed at the bottom of the stand, and comprising:
a plurality of first countersunk holes for inserting a plurality of first screws, and a plurality of second countersunk holes for inserting a plurality of second screws, the first and second countersunk holes being formed by initially punching out a plurality of through-holes in a metal sheet, and then forming countersinks at respective open ends of the through-holes which are open in a surface of the metal sheet to be a lower surface of the bottom plate member, by plastic deformation of the metal sheet by pressing; and
a plurality of accommodating holes which are formed around each of the through-holes, by punching concurrently with the punching out of the through-holes, so as to accommodate the material forming the metal sheet which is flowed upon the formation of the countersinks, in order to prevent the material from rising around the through-hole;
an upper cover formed of a resin, and having in its lower surface a plurality of first screw holes comprising a first group formed at respective positions corresponding to the first countersunk holes, and a second group formed at respective positions corresponding to the second countersunk holes, so that the upper cover is secured to the bottom plate member by inserting the first screws into the first countersunk holes and the first screw holes of the first group while each of the first countersunk holes is aligned with a corresponding one of the first screw holes of the first group and tightening the first screws, and inserting the second screws into the second countersunk holes and the first screw holes of the second group while each of the second countersunk holes is aligned with a corresponding one of the first screw holes of the second group and tightening the second screws;
an annular guide member formed of a resin, comprising:
an upper extending portion protruding from an upper surface of the guide member along the entire circumference at a radial position outward of an inner circumferential surface of the guide member and inward of an outer circumferential surface of the guide member;
a lower extending portion protruding from a lower surface of the guide member along the entire circumference at a radial position outward of an inner circumferential surface of the guide member and inward of an outer circumferential surface of the guide member;
an upper contact portion upward protruding intermittently along the entire circumference from the upper surface of the guide member at a radial position between the inner circumferential surface of the guide member and an inner circumferential surface of the upper extending portion;
a lower contact portion downward protruding along the entire circumference from the lower surface of the guide member at a radial position between the inner circumferential surface of the guide member and an inner circumferential surface of the lower extending portion; and
a plurality of second screw holes formed through the guide member at respective positions which are located radially outward of an outer circumferential surface of the upper extending portion and an outer circumferential surface of the lower extending portion, to be aligned with the first countersunk holes and the first screw holes of the first group, so that the guide member is fixed in a horizontal position between the bottom plate member and the upper cover and centered on the rotation axis, by the inserting the first screws into the first countersunk holes and the first screw holes of the first group and tightening the first screws;
a metal support unit which is supported to be rotatable with respect to and along the guide member, and supports the main body such that the main body is capable of swiveling with respect to the stand and around the rotation axis, the metal support unit comprising:
a metal upper disk member which has a diameter larger than that of the inner circumferential surface of the guide member and smaller than that of the inner circumferential surface of the upper extending portion, and a lower surface of the upper metal disk contacting an upper end of the upper contact portion;
a metal lower disk member which is fixed at its portion located radially inward of the inner circumferential surface of the guide member to the lower surface of the upper disk member, and has a diameter larger than that of the inner circumferential surface of the guide member and smaller than the inner circumferential surface of the lower extending portion, at least a radial part of the lower disk member between the inner circumferential surface of the guide member and the inner circumferential surface of the lower extending portion being located under the guide member, so that the lower disk member contacts a lower end of the lower contact portion; and
a metal support member fixed to an upper surface of the upper disk member so as to support the main body such that the upper and lower disk members sandwiching a radial part of the guide member which is inward of the inner circumferential surface of the upper extending portion and the inner circumferential surface of the lower extending portion, and that the metal support member is rotatable with respect to and along the guide member; and
the positions of a plurality of combinations each consisting of one of the first countersunk holes and a corresponding one of the first screw holes of the first group, being symmetric with respect to the center point of the guide member.

2. A liquid crystal display apparatus comprising:
a main body capable of swiveling around a rotation axis, comprising:
a cabinet; and
a liquid crystal display surface for presenting images thereon; and
a stand aligned with the main body along a direction of the rotation axis, and comprising:
a metal plate member comprising:
a plurality of first countersunk holes for inserting a plurality of first screws, the first countersunk holes being formed by initially punching out a plurality of through-holes in a metal sheet to be the plate member, and then forming countersinks at respective open ends of the through-holes which are open in one of opposite surfaces of the metal sheet, by plastic deformation of the metal sheet by pressing; and
a plurality of accommodating holes which are formed around each of the through-holes, by punching concurrently with the punching out of the through-holes, so as to accommodate the material forming the metal sheet which is flowed upon the formation of the countersinks;

an opposing member having, in its surface opposed to the other surface of the plate member opposite to the surface in which the countersinks are formed, a plurality of first screw holes formed at respective positions corresponding to the first countersunk holes, so that the opposing member and the plate member are secured to each other by inserting the first screws into the first countersunk holes and the first screw holes while each of the first countersunk holes is aligned with a corresponding one of the first screw holes and tightening the first screws;

an annular guide member comprising a plurality of second screw holes formed through the guide member at respective positions corresponding to the first countersunk holes and the first screw holes, so that the guide member is fixed between the plate member and the opposing member and centered on the rotation axis, by the inserting the first screws into the first countersunk holes and the first screw holes and tightening the first screws; and a support unit which is supported to be rotatable with respect to and along the guide member, so as to support the main body such that the main body is capable of swiveling with respect to the stand and around the rotation axis; and the positions of a plurality of combinations each consisting of one of the first countersunk holes and a corresponding one of the first screw holes being symmetric with respect to the center point of the guide member.

3. The liquid crystal display apparatus according to claim 2, wherein the opposing member further has, at respective positions radially outward of the guide member, a plurality of third screw holes for inserting second screws to secure the plate member and the opposing member to each other, and wherein the plate member further comprises a plurality of countersunk holes formed at respective positions corresponding to the third screw holes by first punching out a plurality of second through-holes in the metal sheet, and then forming, by pressing, countersinks at respective open ends of the through-holes which are open on the surface of the metal sheet in which the countersinks of the first countersunk holes are formed, and a plurality of accommodating holes which are formed around each of the second through-holes, by punching, concurrently with the punching out of the second through-holes, so as to accommodate the material forming the metal sheet which is flowed upon the formation of the countersinks.

4. The liquid crystal display apparatus according to claim 2, wherein the annular guide member is formed of a resin and disposed in a horizontal position while the rotation axis extends vertically, the annular guide member further comprising:

an upper extending portion protruding from an upper surface of the guide member along the entire circumference at a radial position outward of an inner circumferential surface of the guide member and inward of an outer circumferential surface of the guide member;

a lower extending portion protruding from a lower surface of the guide member along the entire circumference at a radial position outward of an inner circumferential surface of the guide member and inward of an outer circumferential surface of the guide member; and a plurality of the second screw holes formed through the guide member at respective positions which are located radially outward of an outer circumferential surface of the upper extending portion and an outer circumferential surface of the lower extending portion, and wherein the support unit comprises:

a metal upper disk member which has a diameter larger than that of the inner circumferential surface of the guide member and smaller than the inner circumferential surface of the upper extending portion, and a part of the upper disk member which is radially inward of an inner circumferential surface of the upper extending portion contacts at least a part of the upper surface of the guide member;

a metal lower disk member which is fixed to the upper disk member, and has a diameter larger than that of the inner circumferential surface of the guide member and smaller than that of the inner circumferential surface of the lower extending portion, the lower disk member being located under the guide member at least at its radial part between the inner circumferential surface of the guide member and the inner circumferential surface of the lower extending portion; and a metal support member fixed to an upper surface of the upper disk member to support the main body, such that the upper and lower disk members sandwich a radial part of the guide member which is radially inward of the inner circumferential surface of the upper extending portion and the inner circumferential surface of the lower extending portion, and the metal support member is rotatable with respect to and along the guide member.

5. The liquid crystal display apparatus according to claim 2, wherein the guide member further comprises an upper contact portion upward protruding intermittently along the entire circumference from the upper surface of the guide member at a radial position between the inner circumferential surface of the guide member and an inner circumferential surface of the upper extending portion, an upper end of the upper contact portion being in contact with a lower surface of the upper disk member.

6. The liquid crystal display apparatus according to claim 4, wherein the guide member further comprises a lower contact portion downward protruding along the entire circumference from the lower surface of the guide member at a radial position between the inner circumferential surface of the guide member and an inner circumferential surface of the lower extending portion, a lower end of the lower contact portion being in contact with an upper surface of the lower disk member.

7. The liquid crystal display apparatus according to claim 4, wherein the lower disk member has a first upward protrusion and a second upward protrusion each protruding from a place on the upper surface of the lower disk member including an extreme circumferential edge, the first and second upward protrusions being spaced from each other by a first rotation angle, wherein the guide member has a first rib and a second rib each formed to extend downward from the lower surface of the guide member at respective positions spaced by a second rotation angle larger than the first rotation angle, such that the first and second ribs respectively extend radially inward from the lower extending portion, and wherein the support unit is supported to be rotatable relatively to the guide member with the first and second upward protrusions inserted between the first and second ribs.

8. The liquid crystal display apparatus according to claim 2, wherein a plurality of the accommodating holes are formed around the each of the through-holes such that each of the accommodating holes is spaced from a circumference of the through-hole by a distance of ⅕ to 1 times a diameter of the through-hole.

9. The liquid crystal display apparatus according to claim 8, wherein the each of the accommodating holes formed around the each through-hole has a diameter of ¼ to ¾ of the diameter of the through-hole.

10. The liquid crystal display apparatus according to claim 9, wherein at least a part of the accommodating holes formed around the each through-hole are spaced from an adjacent other by a distance of ⅕ to 1 times the diameter of the through-hole.

11. The liquid crystal display apparatus according to claim 2, wherein the accommodating holes formed around each of the through-holes are equiangularly arranged in a circle centered on the through-hole, and have a substantially identical circular shape.

12. The liquid crystal display apparatus according to claim 11, wherein the number of the accommodating holes is three.

13. The liquid crystal display apparatus according to claim 11, wherein the number of the accommodating holes is four.

14. The liquid crystal display apparatus according to claim 2, wherein each of the accommodating holes formed around each of the through-holes has a circular shape.

15. The liquid crystal display apparatus according to claim 14, wherein the accommodating holes are arranged in a circle centered on the through-hole.

16. The liquid crystal display apparatus according to claim 2, wherein the accommodating holes are formed around each of only a part of the countersunk holes which are formed for screwing the guide member.

* * * * *